(12) United States Patent
Tohda et al.

(10) Patent No.: US 7,658,440 B2
(45) Date of Patent: Feb. 9, 2010

(54) ARRANGEMENT STRUCTURE FOR AUXILIARY COMPONENT OF VEHICLE

(75) Inventors: Isao Tohda, Fuchu-cho (JP); Kouji Iwasaka, Fuchu-cho (JP); Katsumasa Sogame, Fuchu-cho (JP); Shigeyuki Mori, Fuchu-cho (JP)

(73) Assignee: Mazda Motor Corporation (JP)

( * ) Notice: Subject to any disclaimer, the term of this patent is extended or adjusted under 35 U.S.C. 154(b) by 414 days.

(21) Appl. No.: 11/392,686

(22) Filed: Mar. 30, 2006

(65) Prior Publication Data

US 2006/0238000 A1 Oct. 26, 2006

(30) Foreign Application Priority Data

| Apr. 6, 2005 | (JP) | 2005-109319 |
| Apr. 7, 2005 | (JP) | 2005-110516 |
| Apr. 11, 2005 | (JP) | 2005-112960 |
| Sep. 14, 2005 | (JP) | 2005-266281 |
| Sep. 27, 2005 | (JP) | 2005-279538 |

(51) Int. Cl.
*B62D 25/20* (2006.01)
(52) U.S. Cl. .................................................. 296/204
(58) Field of Classification Search ................ 296/204, 296/64; 180/309; 280/830, 834
See application file for complete search history.

(56) References Cited

U.S. PATENT DOCUMENTS

| 7,073,824 B2* | 7/2006 | Uhara et al. ............... 280/834 |
| 7,252,319 B2* | 8/2007 | Toyota et al. ............. 296/65.09 |
| 7,434,871 B2* | 10/2008 | Mizuma et al. ......... 296/193.07 |
| 2004/0099465 A1 | 5/2004 | Matsumoto et al. |
| 2004/0104602 A1* | 6/2004 | Cardimen et al. ........... 296/204 |
| 2005/0218683 A1* | 10/2005 | Toyota et al. ................. 296/64 |
| 2006/0061143 A1* | 3/2006 | Okana et al. ................ 296/204 |
| 2007/0126264 A1* | 6/2007 | Mizuma et al. ............. 296/204 |
| 2007/0216186 A1* | 9/2007 | Sumida et al. ................ 296/64 |
| 2008/0238152 A1* | 10/2008 | Konishi et al. .............. 296/204 |

FOREIGN PATENT DOCUMENTS

| JP | 05-000627 | 8/1993 |
| JP | 06-211169 | 2/1994 |
| JP | 10-264864 | 10/1998 |
| JP | 2005-170296 | 6/2005 |

OTHER PUBLICATIONS

European Search Report, EP 06006555, Aug. 22, 2006.

* cited by examiner

*Primary Examiner*—H Gutman
(74) *Attorney, Agent, or Firm*—Studebaker & Brackett PC; Donald R. Studebaker

(57) ABSTRACT

An arrangement structure for an auxiliary component of a vehicle includes a floor panel defining the bottom surface of the passenger compartment. The floor panel includes a first kick-up portion and a second kick-up portion disposed in side-by-side relation to the first kick-up portion in a lateral direction of a vehicle body. The second kick-up portion is formed to have a height greater than that of the first kick-up portion. A first seat is disposed on the first kick-up portion, a second seat is formed to have a smaller size than that of the first seat and disposed on the second kick-up portion, and a cross member is joined along the second kick-up portion in the lateral direction to form a closed section therebetween. The arrangement structure of the present invention allows a vehicle to have a low overall-height compact body while achieving enhanced layout flexibility and assuring a passenger compartment space.

20 Claims, 44 Drawing Sheets

ARRANGEMENT STRUCTURE FOR AUXILIARY COMPONENT OF VEHICLE

BACKGROUND OF THE INVENTION

1. Field of the Invention

The present invention relates to an arrangement structure for an auxiliary component of a vehicle component in a region outside of a bottom surface of a passenger compartment of the vehicle.

2. Description of the Related Art

Heretofore, there has been known an arrangement structure for an auxiliary component of a vehicle, as shown in FIGS. 42, 43 and 44, wherein FIG. 42 is a schematic top plan view of a passenger compartment, and FIGS. 43 and 44 are side views of the arrangement structure, viewed, respectively, from the side of a driver's seat and from the side of a front passenger seat.

Specifically, FIGS. 42, 43 and 44 show an arrangement structure for an auxiliary component of a four-passenger (four-seater) vehicle. In this arrangement structure, a driver's seat 101 and a front passenger seat 102 are disposed right and left on a front region of a floor panel 100 defining a bottom surface of a passenger compartment, in spaced-apart side-by-side relation to one another. A kick-up portion 103 stepped upward is formed in a rear region of the floor panel 100 in such a manner to extend in a width or lateral direction of a vehicle body at an even height. A pair of right and left rear seats 104, 105 are disposed on the kick-up portion 103 in side-by-side relation to one another, and a fuel tank 106 as an auxiliary component is arranged below an outer surface of a laterally intermediate region of the kick-up portion 103.

As another example, the following Patent Publication 1 discloses an arrangement structure for an auxiliary component of a vehicle. In this arrangement structure, a floor panel is formed with a kick-up portion which has an even height in a lateral direction of a vehicle body and includes a downward curved region and an extension region extending upward directly from the downward curved region. A rear seat is disposed on the kick-up portion, and a fuel tank is arranged below an outer surface of the kick-up portion. Further, the fuel tank has a top surface formed in conformity to respective shapes of the downward curved region and the extension region.

As yet another example, the following Patent Publication 2 discloses an arrangement structure for an auxiliary component of a vehicle. In this arrangement structure, a kick-up zone stepped upward is formed in a floor panel, and a kick-up floor zone is formed to extend continuously rearward from the kick-up zone. Further, a rear kick-up zone is formed to extend upward from a rear edge of the kick-up floor zone, and a rear kick-up floor zone is formed to extend continuously rearward from the rear kick-up zone. Each of the kick-up zone, the kick-up floor zone, the rear kick-up zone and the rear kick-up floor zone is formed to have an even height in a lateral direction of a vehicle body. A rear seat is disposed on the kick-up floor zone and the rear kick-up zone, and a fuel tank is arranged below a continuous outer surface of the kick-up zone, the kick-up floor zone, the rear kick-up zone and the rear kick-up floor zone. The fuel tank has a shape conformable to the shape of the continuous outer surface of the respective zones.

[Patent Publication 1] Japanese Patent Laid-Open Publication No. 06-211169

[Patent Publication 2] Japanese Patent Laid-Open Publication No. 05-000627

In the above conventional structures, the kick-up portion is formed to have an even area and height in a lateral direction of a vehicle body. Thus, if the vehicle is designed to allow two passengers to be seated, respectively, in the rear seats 104, 105 disposed on the kick-up portion, an overall vehicle height has to be increased across the lateral direction. This hinders downsizing the vehicle.

In view of this problem, it is an object of the present invention to provide an arrangement structure for an auxiliary component of a vehicle, capable of allowing a vehicle to have a low overall-height compact body while achieving enhanced layout flexibility and assuring a passenger compartment space.

SUMMARY OF THE INVENTION

In order to achieve the above object, according to a first aspect of the present invention, there is provided an arrangement structure for an auxiliary component of a vehicle in a region outside of a bottom surface of a passenger compartment of the vehicle, which comprises a floor panel defining the bottom surface of the passenger compartment and having a first kick-up portion and a second kick-up portion disposed in side-by-side relation to the first kick-up portion in a lateral direction of a vehicle body and formed to have a height greater than that of the first kick-up portion. The auxiliary component is arranged below the second kick-up portion.

In the arrangement structure set forth in the first aspect of the present invention, a large-size interior component can be placed on the first kick-up portion. Further, an auxiliary component can be arranged below the second kick-up portion, and a small-size interior component can be placed on the second kick-up portion. This makes it possible to provide enhanced layout flexibility in a limited vehicle space. In other words, the present invention allows for a desirable vehicle design capable of satisfying both of a low overall-height compact body and an adequate arrangement of the auxiliary component.

These and other objects, features and advantages of the invention will become more apparent upon reading the following detailed description along with the accompanying drawings.

DETAILED DESCRIPTION OF THE PREFERRED EMBODIMENTS OF THE INVENTION

With reference to the drawings, a first embodiment of the present invention will now be described.

Figure 1:
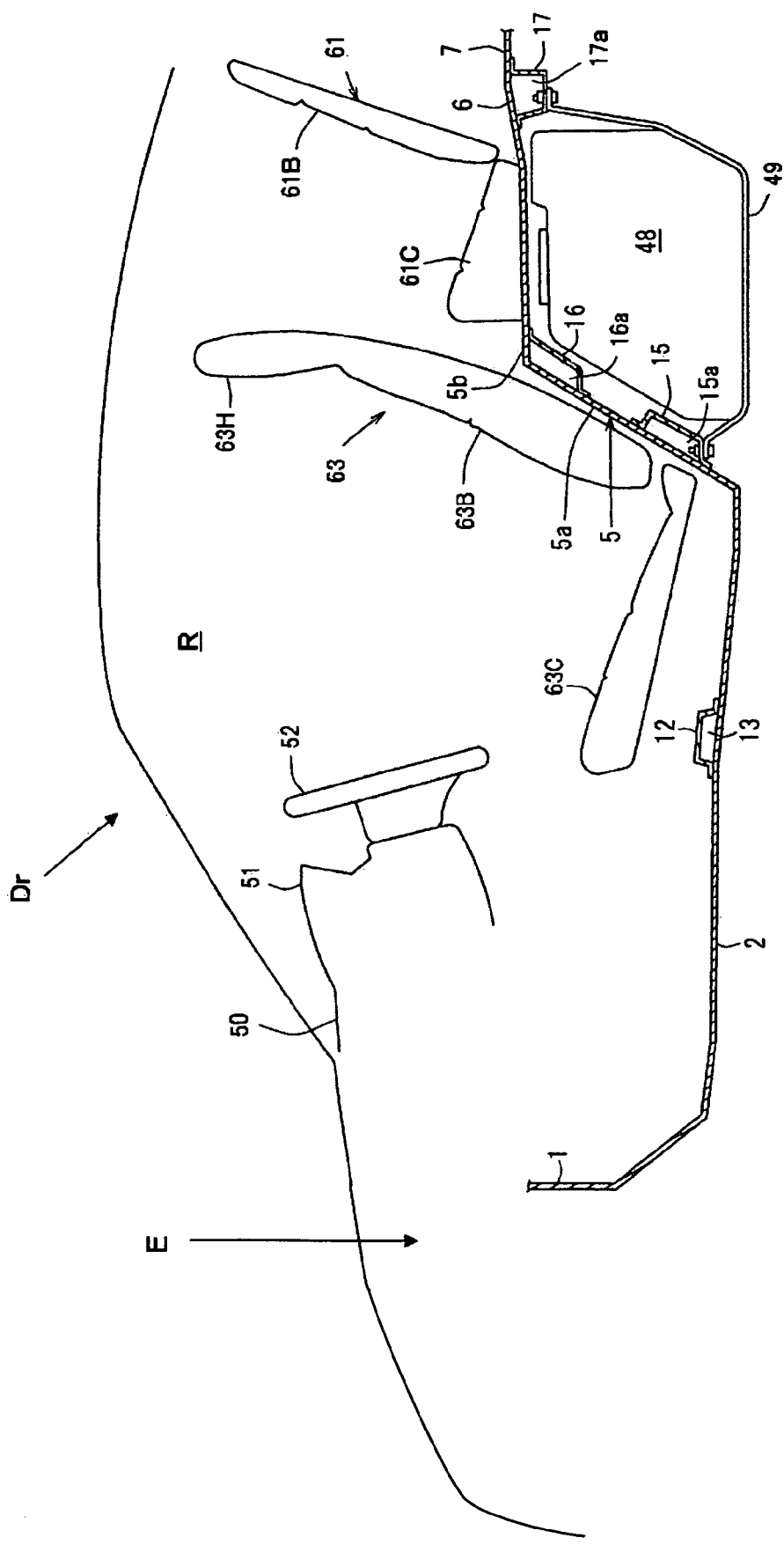
FIG. 1 is a side view showing an arrangement structure for an auxiliary component of a vehicle, according to a first embodiment of the present invention, viewed from the side of a driver's seat.
Figure 2:
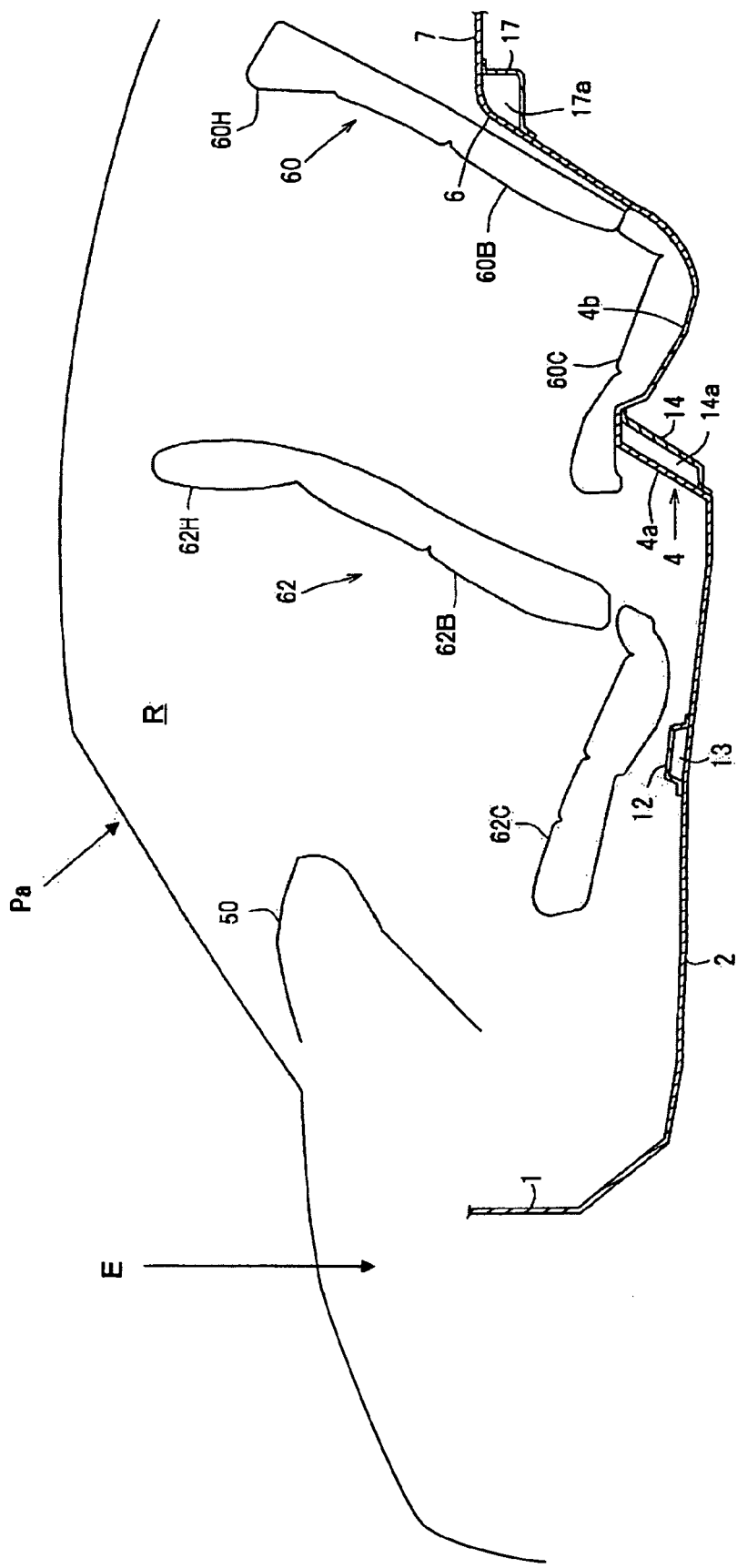
FIG. 2 is a side view showing the auxiliary-component arrangement structure, viewed from the side of a front passenger seat.

FIGS. 1 and 2 are side views showing an arrangement structure for an auxiliary component of a vehicle, according to the first embodiment, viewed, respectively, from the side of a driver's seat Dr and from the side of a front passenger seat Pa.

A lower dash panel (dash panel) 1 is disposed in a front region of a vehicle to partition between an engine compartment E and a passenger compartment R in a frontward/rearward or longitudinal direction of a vehicle body. A floor panel 2 is connected to a rear side of a lower edge of the lower dash panel 1 to extend approximately horizontally toward a rear region of the vehicle. The floor panel 2 defines a lower surface (bottom surface) of the passenger compartment R.

Figure 3:
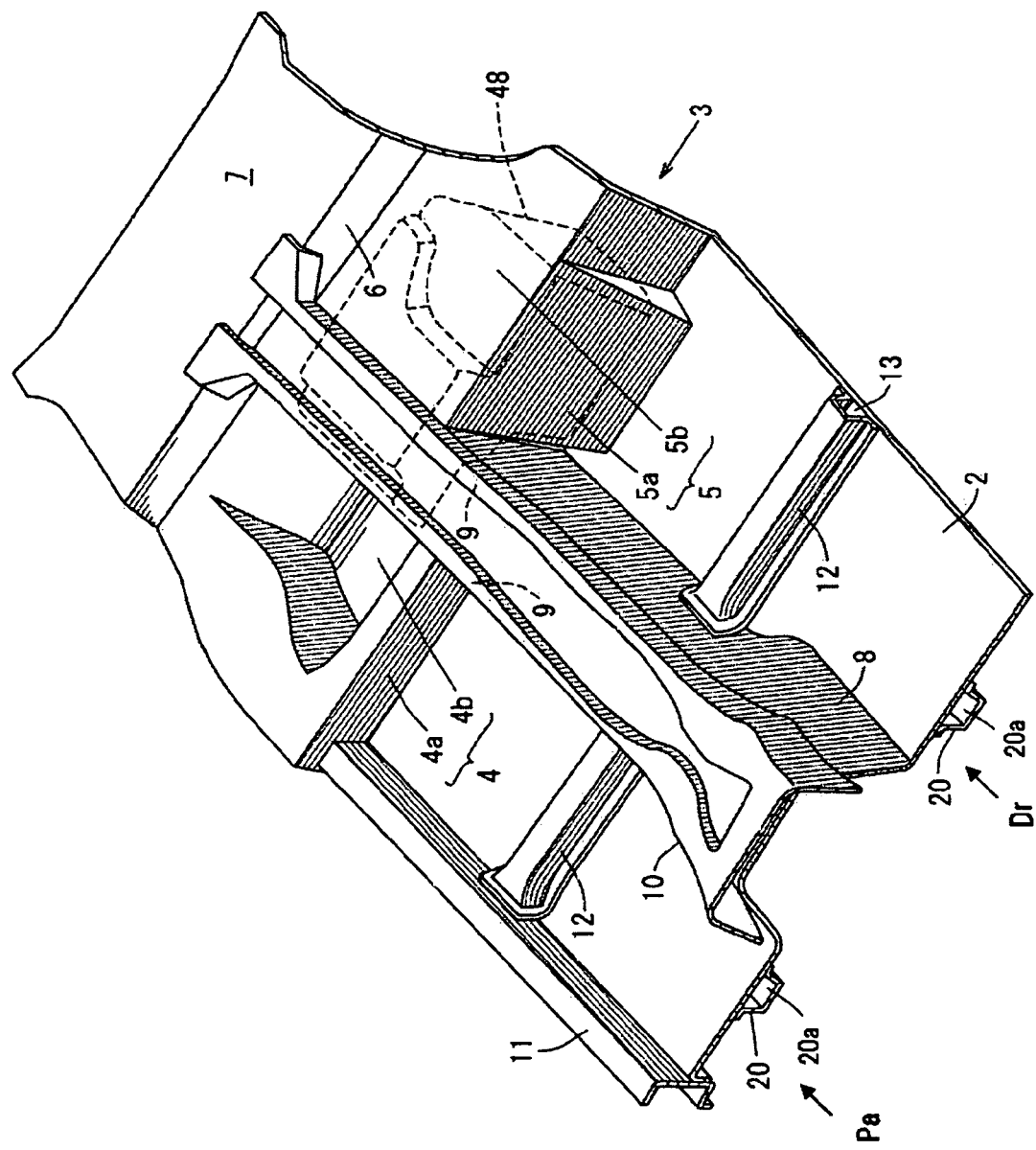
FIG. 3 is a perspective view showing the auxiliary-component arrangement structure.

FIG. 3 is a perspective view showing the floor panel 2. The floor panel 2 has a kick-up area 3 stepped upward in a rear region thereof. The kick-up area 3 includes a first kick-up portion 4 on the front-passenger-seat side Pa, and a second kick-up portion 5 on the driver's seat side Dr. The first kick-up portion 4 and the second kick-up portion 5 are disposed in side-by-side relation to one another in a width or lateral direction of the vehicle body.

The second kick-up portion 5 is formed to have a height greater than the first kick-up portion 4. In this embodiment, the second kick-up portion 5 is designed to have a height two times or more greater than that of the first kick-up portion 4.

The first kick-up portion 4 has a front wall zone 4a extending upward from the floor panel 2, and a kick-up floor zone 4b extending rearward from the front wall zone 4a. This kick-up floor zone 4b has a central region formed as a downward concave region.

The second kick-up portion 5 has a front wall zone 5a extending upward from the floor panel 2, and a kick-up floor zone 5b extending rearward from the front wall zone 5a approximately horizontally.

Further, a rear kick-up portion 6 is formed to extend rearward upward from respective rear edges of the kick-up floor zones 4b, 5b at a relatively small tilt angle, and a rear floor 7 extends rearward from a rear edge of the rear kick-up portion 6.

The floor panel 2 has a central region formed as a tunnel portion 8 which protrudes upward and extends in the longitudinal direction of the vehicle body. A tunnel member 10 (so-called "high-mount backbone frame") is joined to an upper surface of the tunnel portion 8 to form two closed sections 9 (see FIG. 5) in corporation with the tunnel portion 8.

The tunnel member 10 is a body-rigidifying member (reinforcing member) extending along the upper surface of the tunnel portion 8 in the longitudinal direction of the vehicle body to provide higher rigidity to the floor panel and the vehicle body.

A pair of right and left side sills 11 are joined, respectively, to laterally opposite side regions of the floor panel 2 to extend the longitudinal direction of the vehicle body. Each of the side sills is formed by joining an outer sill panel, an inner sill panel and a reinforcement panel together, as a body-rigidifying member having a closed section and extending in the longitudinal direction of the vehicle body. In FIG. 3, only the inner sill panel is illustrated.

A pair of right and left cross members 12 are joined along a longitudinally intermediate region of the floor panel 2 in the lateral direction of the vehicle body in such a manner to connect the tunnel portion 8 and each of the inner sill panel 11 and form a closed section in cooperation with a top surface of the floor panel 2.

Figure 4:
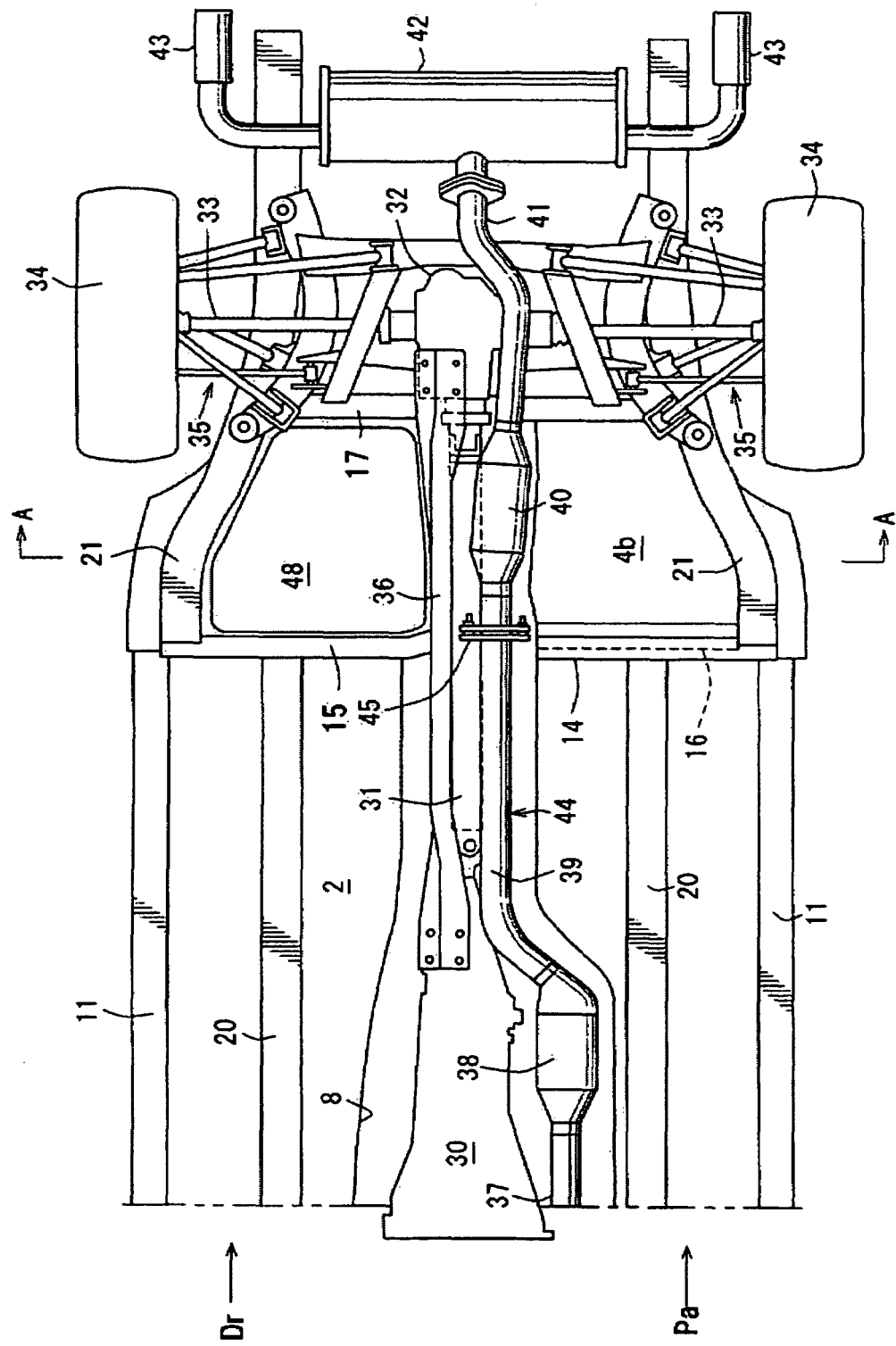
FIG. 4 is a fragmentary bottom view of the vehicle.

FIG. 4 is a bottom view showing the floor panel 2 of the vehicle. As shown in FIGS. 4 and 2, a lower cross member 14 is joined along a lower region of a rear surface of the front wall zone 4a of the first kick-up portion 4, in the lateral direction, and a laterally-extending closed section 14a is formed between the lower cross member 14 and the front wall zone 4a. Further, as shown in FIGS. 4 and 1, a lower cross member 15 is joined along a lower region of a rear surface of the front wall zone 5a of the second kick-up portion 5, in the lateral direction to extend in side-by-side relation to the lower cross member 14 in the lateral direction. A laterally-extending closed section 15a is formed between the lower cross member 15 and the front wall zone 5a.

As shown in FIGS. 1 and 4, an upper cross member 16 is joined along a corner region defined between the front wall zone 5a and the kick-up floor zone 5b of the second kick-up portion 5, in the lateral direction, and a laterally-extending closed section 16a is formed by the upper cross member 16, the front wall zone 5a and the kick-up floor zone 5b.

This upper cross member 16 is joined only to the second kick-up portion 5. In other words, the first kick-up portion 4 has no upper cross member.

As shown in FIGS. 1, 2 and 4, a rear cross member 17 is joined along a bottom surface of the rear kick-up portion 6 in the lateral direction, and a laterally-extending closed section 17a is formed between the rear cross member 17 and the rear kick-up portion 6. This rear cross member 17 is a single piece of body-rigidifying member continuously joined along approximately the entire width of the rear kick-up portion 6 in the lateral direction.

The plurality of cross members 14, 15, 16, 17 are joined to the kick-up area at different positions in the vertical and longitudinal directions to provide enhanced body rigidity and enhanced resistance against a side-impact collision.

As shown in FIGS. 3 and 4, a pair of right and left floor frames 20 are joined to the bottom surface of the floor panel 2, respectively, at right and left intermediate regions between the tunnel portion 8 and the right and left side sills 11, and a closed section 20a is formed between the floor panel 2 and each of the floor frames 20. The floor frame 20 is a body-rigidifying member joined to the floor panel 2.

Figure 5:
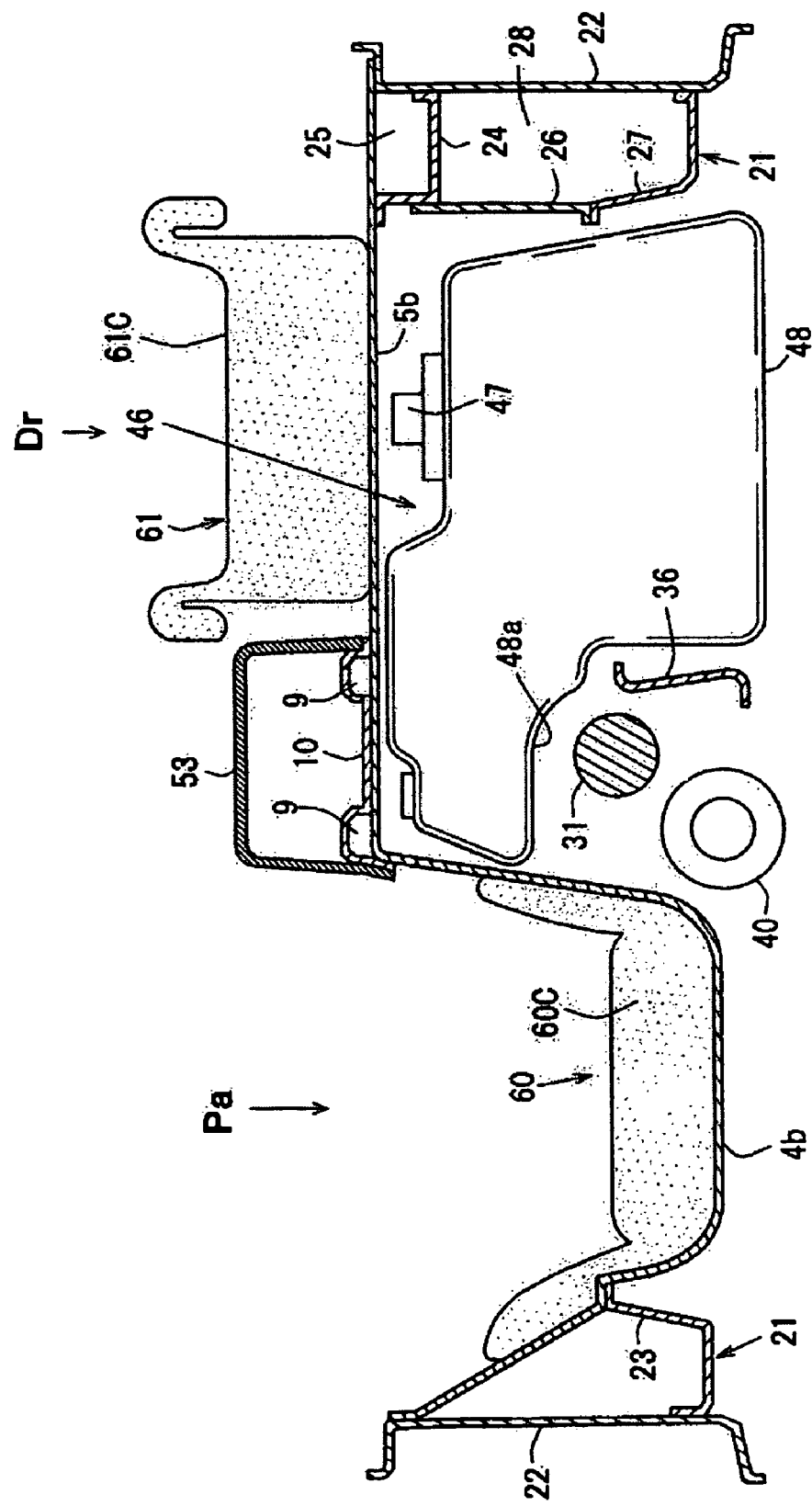
FIG. 5 is a sectional view taken along the line A-A in FIG. 4.

FIG. 5 is a sectional view taken along the line A-A in FIG. 4. As shown in FIGS. 4 and 5, a set of a rear side frame 21 and a rear side inner panel 22 is joined to a bottom surface of each of laterally opposite side ends of the kick-up floor zones 4b, 5b and the rear floor 7. Further, a lower rear side frame 23 is joined between the rear side inner panel 22 and the kick-up floor zone 4b on the front-passenger-seat side Pa.

A rear floor frame 24 is joined between the rear side inner panel 22 and the kick-up floor zone 5b on the driver's-seat side Dr to form a longitudinally-extending closed section 25. Further, an upper rear side frame 26 and lower rear side frame 27 are joined, respectively, to the rear floor frame 24 and the rear side inner panel 22 to form a longitudinally-extending closed section 28.

Drivetrain components are arranged as shown in FIG. 4. Specifically, a transmission 30 is arranged in a space below an outer surface of the tunnel portion 8. An output of the transmission 30 is transmitted to a differential unit 32 through a propeller shaft 31, and an output of the differential unit 32 is transmitted to right and left rear wheels 34 through right and left rear drive shafts 33. In this embodiment, the right and left rear wheels 34 are each independently suspended by a double wishbone suspension 35 independently.

A longitudinally-extending power plant frame 36 having an approximately Z shape (see FIG. 5) is attached between a transmission casing of the transmission 30 and the differential unit 32. This power plant frame (PPF) 36 serves as a means to suppress wind-up vibrations of the differential unit 32 while allowing movement in a rolling direction from engine/drivetrain.

An arrangement structure for an auxiliary component of the vehicle will be described below.

As shown in FIG. 4, an exhaust pipe 44 comprises a front exhaust pipe 37, a catalytic converter 38, a middle exhaust pipe 39, a pre-silencer 40, a rear exhaust pipe 41, a main silencer 42 and a tail-pipe 43. The exhaust pipe 44 is supported by the vehicle body through a bracket 45. The front exhaust pipe 37, the catalytic converter 38 and the middle exhaust pipe 39 are arranged below the outer surface of the tunnel portion 8, and a part of the middle exhaust pipe 39 and the pre-silencer 40 are arranged in a space (bottom space) 46 below an outer surface of the second kick-up portion 5 (see FIG. 5).

As shown in FIGS. 1 and 5, as a large-size auxiliary component of the vehicle, a fuel tank 48 with a fuel pump 47 is arranged in the bottom space 46 outside of the second kick-up portion 5.

In this embodiment, as shown in FIG. 5, a portion of the fuel tank 48 opposed to the propeller shaft 31, the power plant frame 36 and the pre-silencer 40 is formed as a concave portion 48a. The power plant frame 36, the propeller shaft 31 and the pre-silencer 40 are arranged below the concave portion 48a.

That is, a plurality of auxiliary components, i.e., a part of power plant frame 36, a part of the propeller shaft 31, the pre-silencer 40 and the fuel tank 48, are arranged in the bottom space 46 outside of the second kick-up portion 36 in side-by-side relation to each other in the lateral direction.

As shown in FIG. 1, a tank band 49 is attached between the lower cross member 15 and the rear cross member 17, and the fuel tank 48 is supported by the vehicle body through the tank band 49.

In FIGS. 1 and 2, the reference numeral 50 indicates an instrument panel; 51 indicates a meter hood; and 52 indicates a steering wheel. In FIG. 5, the reference numeral 53 indicates a center console.

Figure 6:
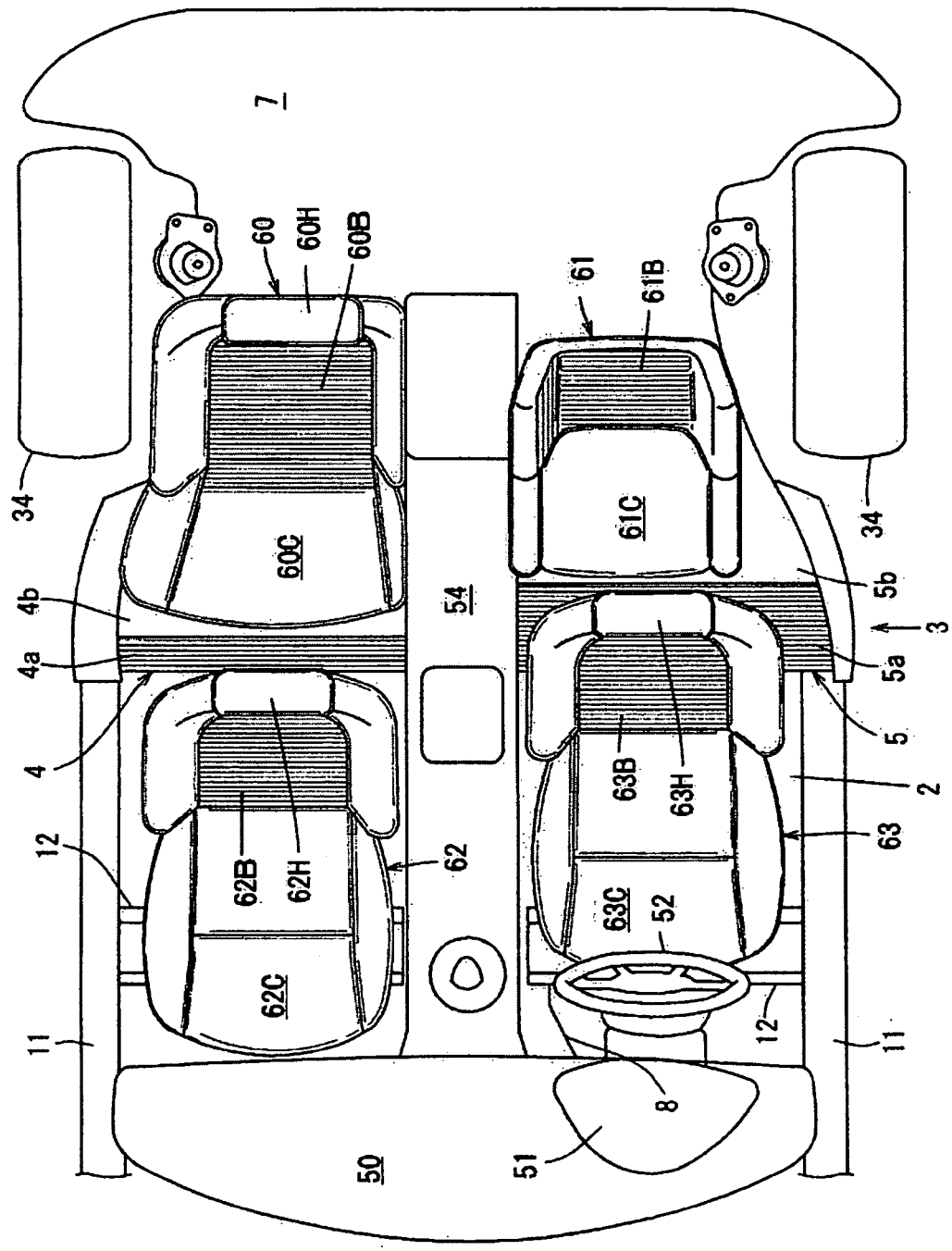
FIG. 6 is a top plan view showing a seat arrangement structure of the vehicle.

With reference to FIGS. 1, 2 and 6, an arrangement structure for seats will be described. FIG. 6 is a top plan view showing the passenger compartment R.

As shown in FIG. 2, a large-size rear seat 60 capable of allowing an adult passenger to be seated therein is disposed on the kick-up floor zone 4b on the front-passenger-seat side Pa. The rear seat 60 comprises a seat cushion 60C, a seatback 60B and a headrest 60H. The seat cushion 60C is formed in conformity to a shape of the central concave portion of the kick-up floor zone 4b to ensure a vertical space for a passenger to be seated in the rear seat 60.

As shown in FIG. 1, a small-size child's seat 61 (hereinafter referred to simply as "child seat") smaller than the rear seat 60 is disposed on the kick-up floor zone 5b on the driver's-seat side Dr. The child seat 61 comprises a seat cushion 61C and a seatback 61B.

Two front seats are disposed in front, respectively, of the rear seat 60 and the child seat 61. Specifically, a front passenger seat 62 is disposed in front of the rear seat 60, and a driver's seat 63 is disposed in front of the child seat 61. These front seats are disposed in side-by-side relation to one another in the lateral direction.

In this embodiment, the front passenger seat 62 comprises a seat cushion 62C, a seatback 62B and a headrest 62H. Similarly, the driver's seat 63 comprises a seat cushion 63C, a seatback 63B and a headrest 63H.

As shown in FIG. 6, the front passenger seat 62 is displaced relative to the driver's seat 63 in the frontward direction of the vehicle body. This arrangement makes it possible to ensure a foot space of the rear seat 60.

Figure 7:
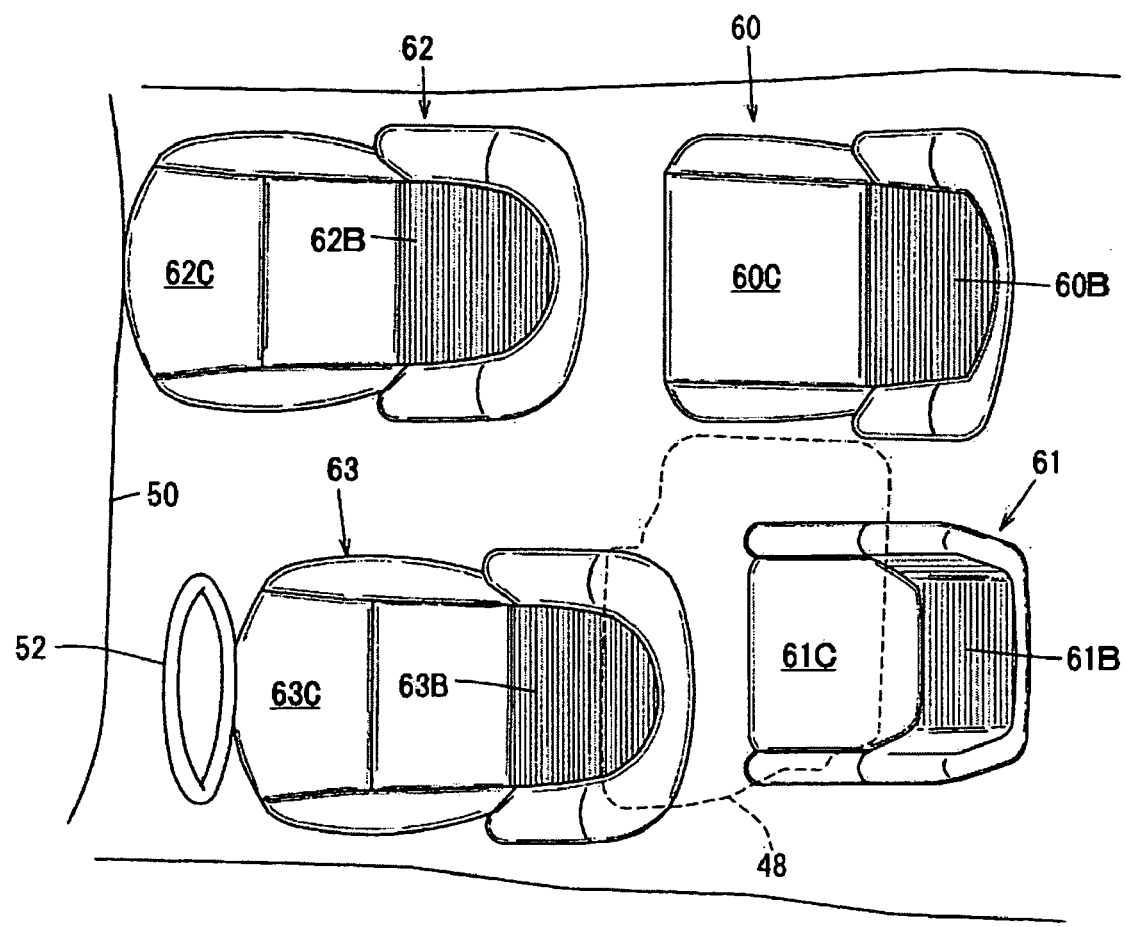
FIG. 7 is a schematic top plan view showing the auxiliary-component and seat arrangement structures.
Figure 8:
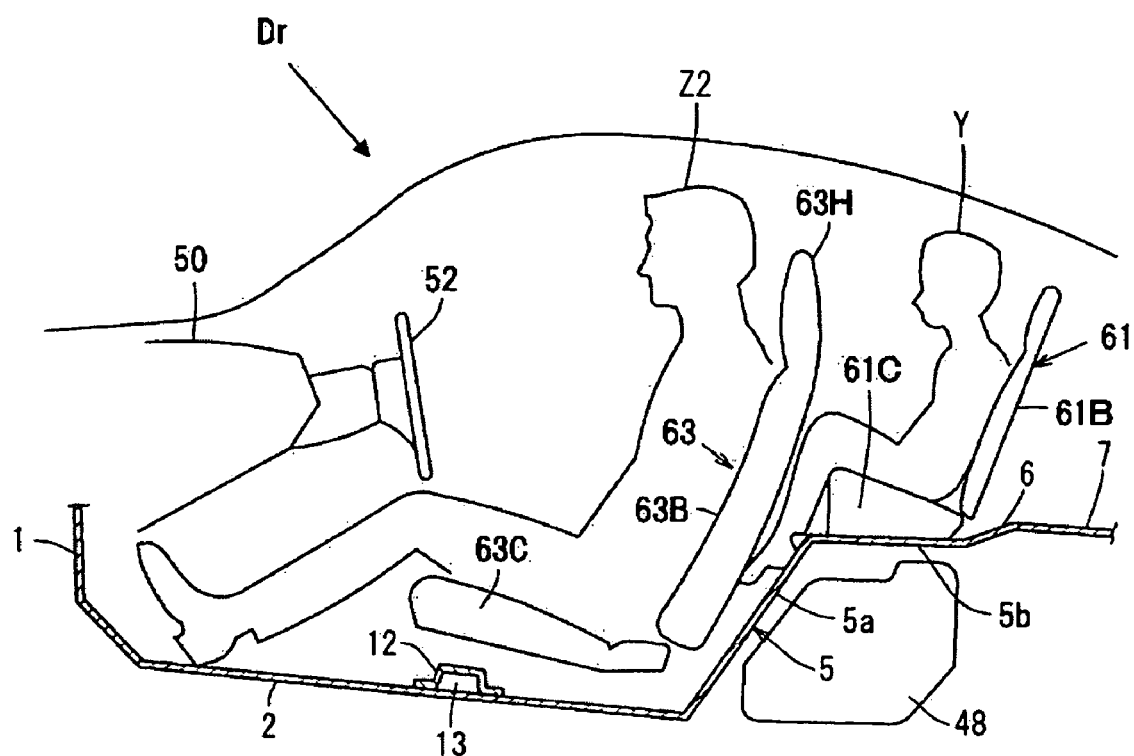
FIG. 8 is a schematic side view showing the auxiliary-component and seat arrangement structures in a state when a passenger is seated in a seat, viewed from the side of the driver's seat.
Figure 9:
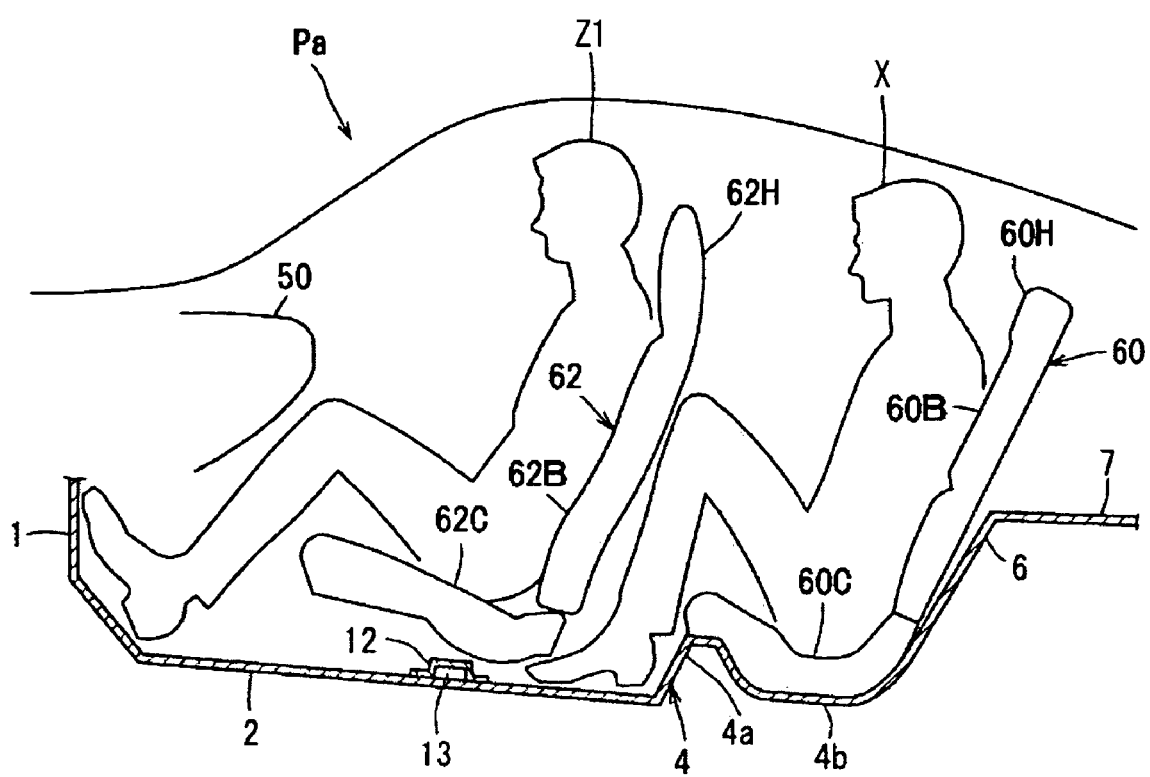
FIG. 9 is a schematic side view showing the auxiliary-component and seat arrangement structures in a state when a passenger is seated in a seat, viewed from the side of the front passenger seat.
Figure 42:
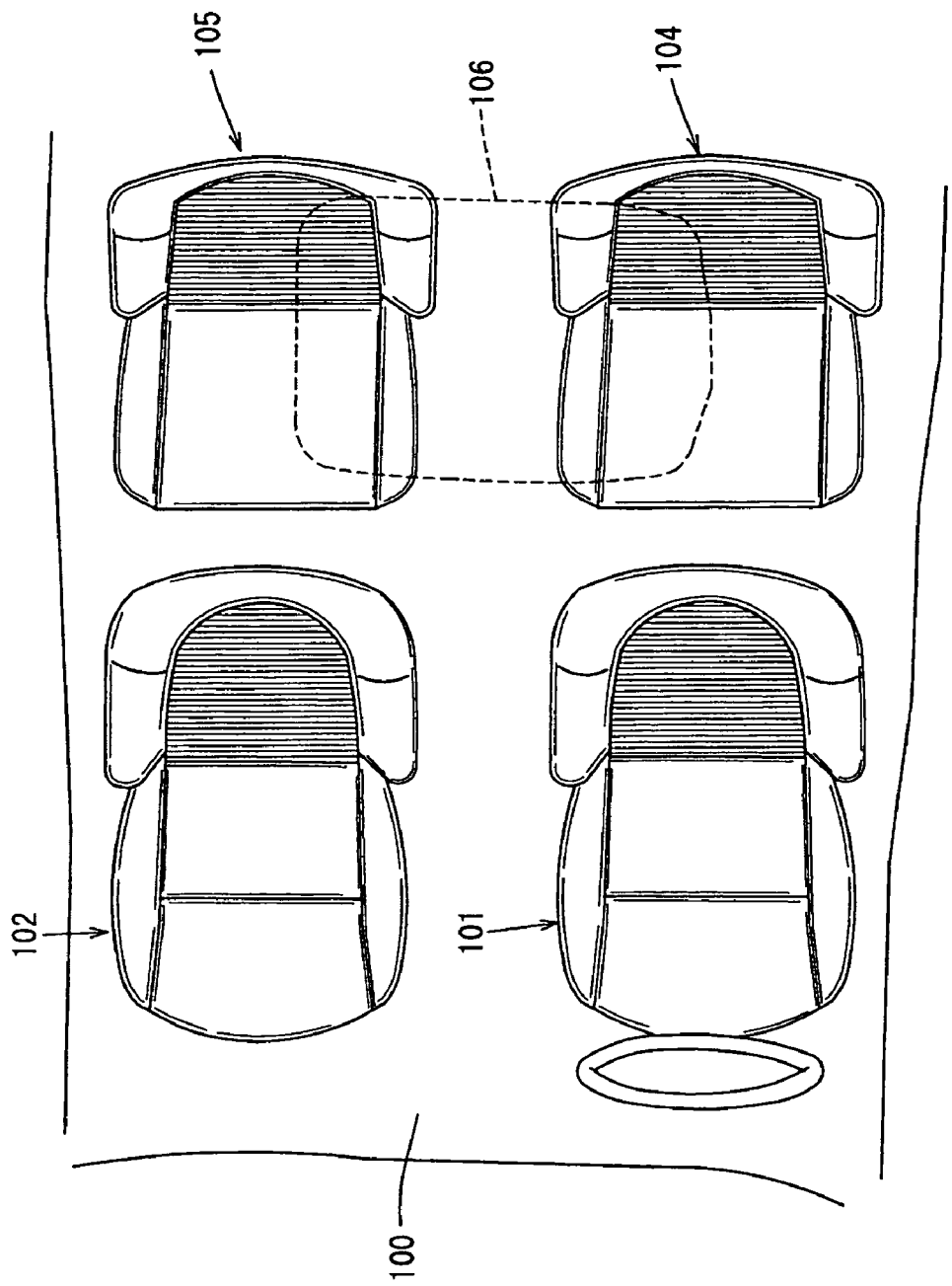
FIG. 42 is a top plan view showing a conventional auxiliary-component arrangement structure.
Figure 43:
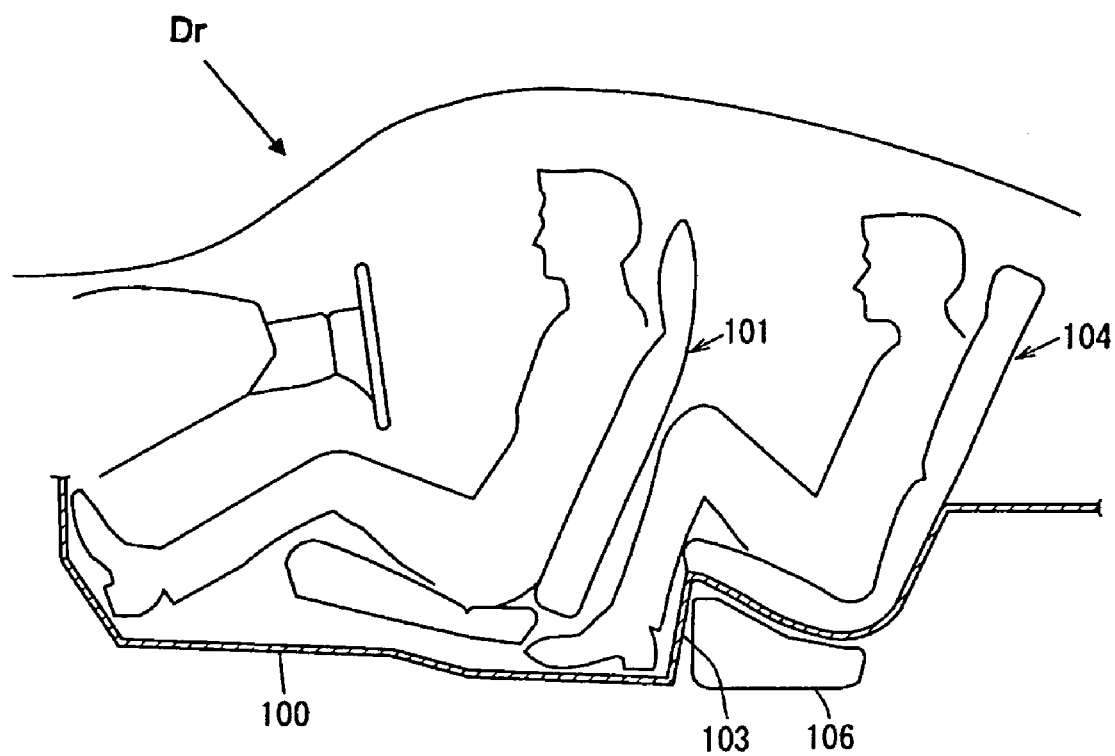
FIG. 43 is a side view showing the conventional auxiliary-component arrangement structure, viewed from the side of a driver's seat.
Figure 44:
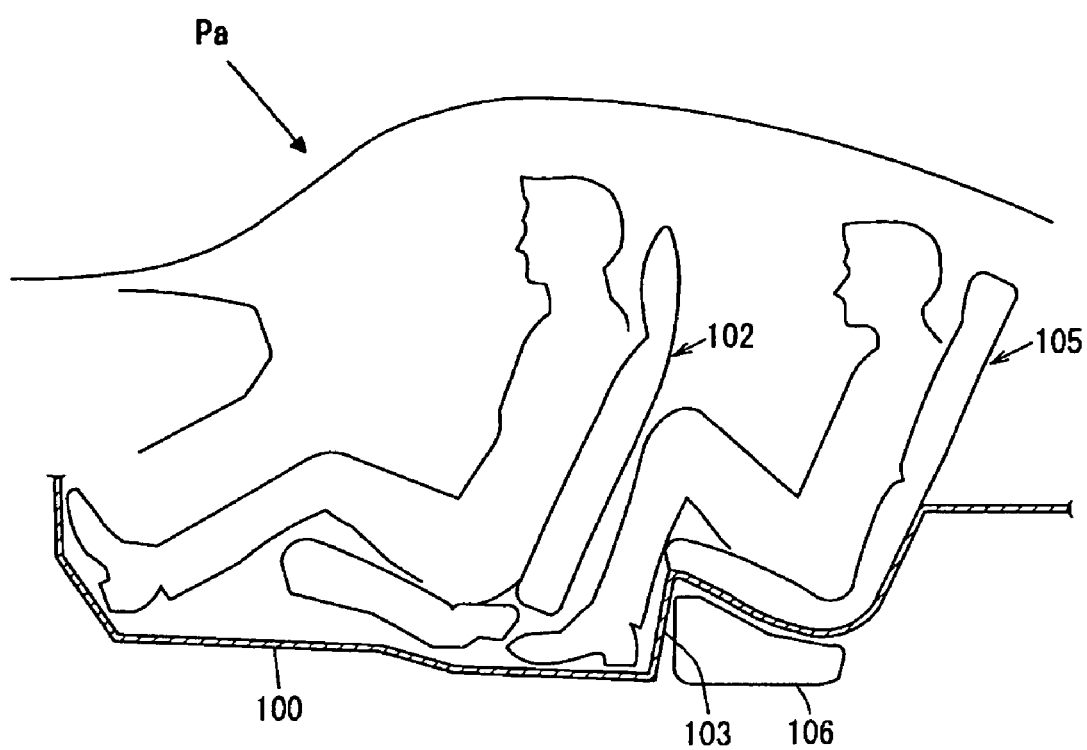
FIG. 44 is a side view showing the conventional auxiliary-component arrangement structure, viewed from the side of a front passenger seat.

FIG. 7 is a schematic top plan view showing the seat arrangement structure, and FIGS. 8 and 9 are schematic side views showing the seat arrangement structure, viewed, respectively, from the side of the driver's seat Dr and from the side of the front passenger seat Pa. FIGS. 7, 8 and 9 are intended to compare, particularly, with FIGS. 42, 43 and 44 which show the conventional structure.

Figure 10:
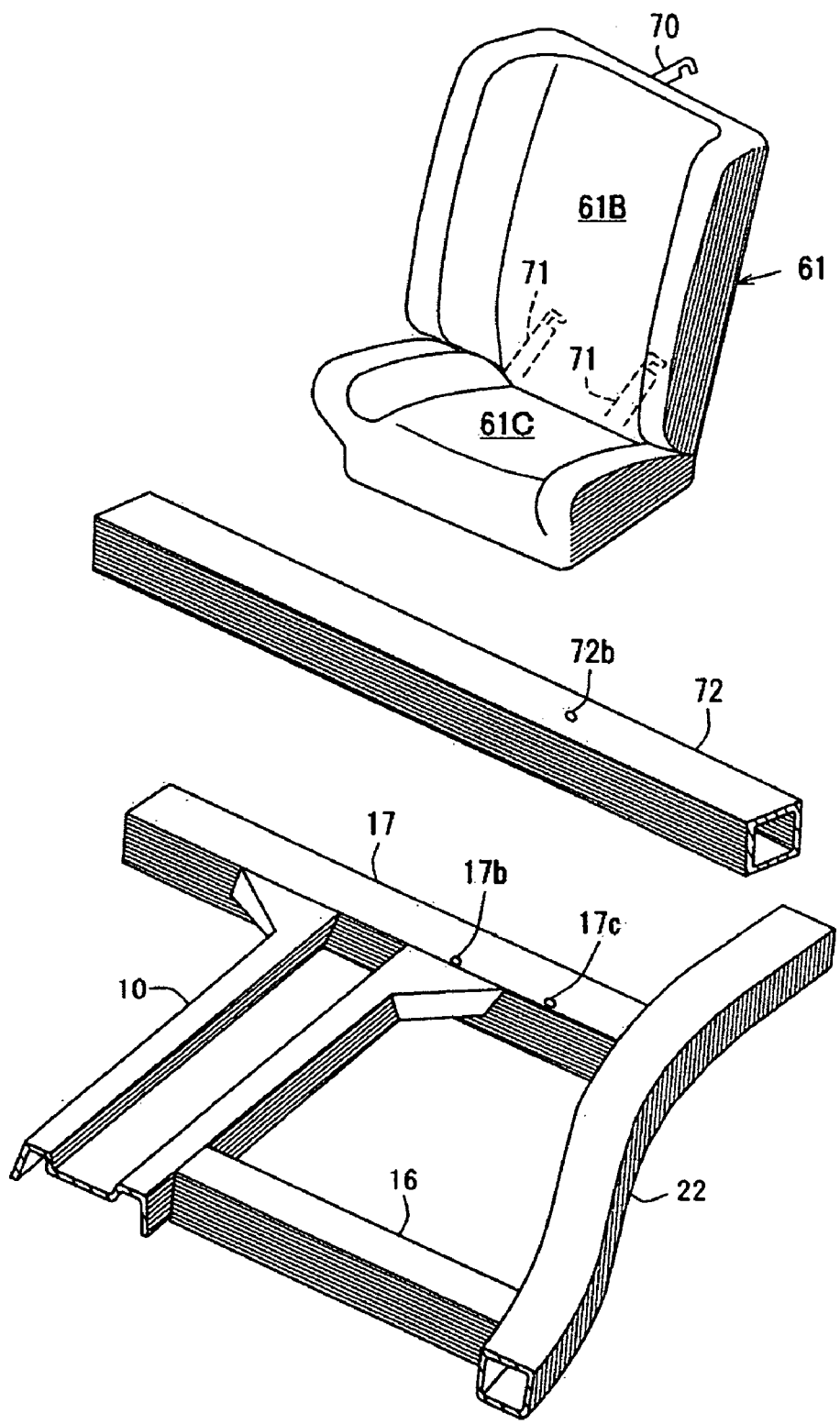
FIG. 10 is an exploded perspective view showing a mounting structure for a second seat.
Figure 11:
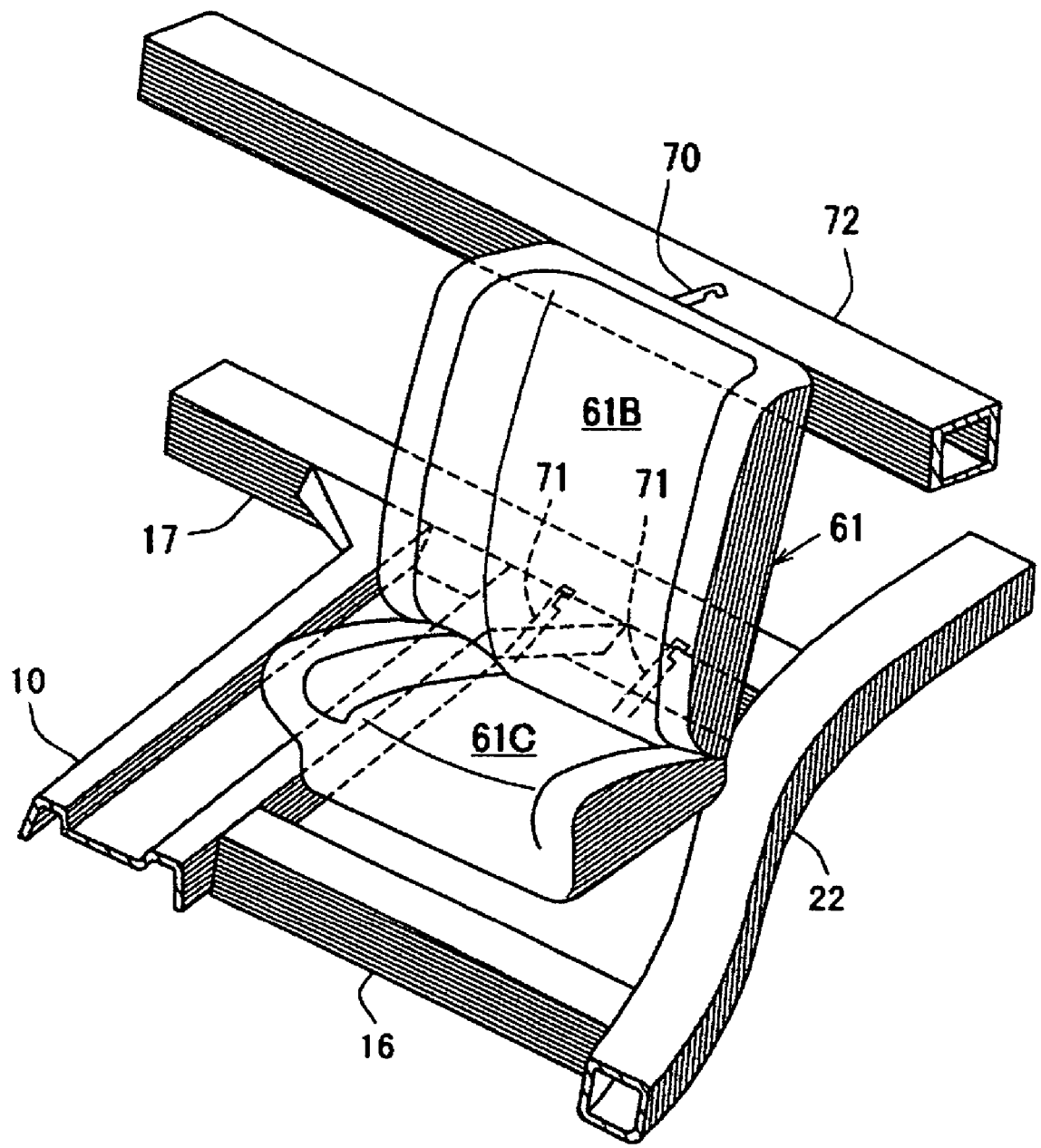
FIG. 11 is a perspective view showing the second-seat mounting structure.

FIGS. 10 and 11 are perspective views showing a mounting structure of the child seat 61. As shown in FIGS. 10 and 11, a tether anchor 70 and a plurality of lower anchors 71 are fixed to a rear surface of the child seat 61. A mounting portion 72b of the tether anchor 70 is formed in a deck member 72 having a closed section and extending in the lateral direction, and a plurality of mounting portions 17b, 17c of the lower anchors are formed in the rear cross member 17. The child seat 61 is fixed to the vehicle body by attaching the tether anchor 70 and the lower anchors 71, respectively, to the mounting portion 72b and the mounting portions 17b, 17c, as shown in FIG. 11.

Figure 12:
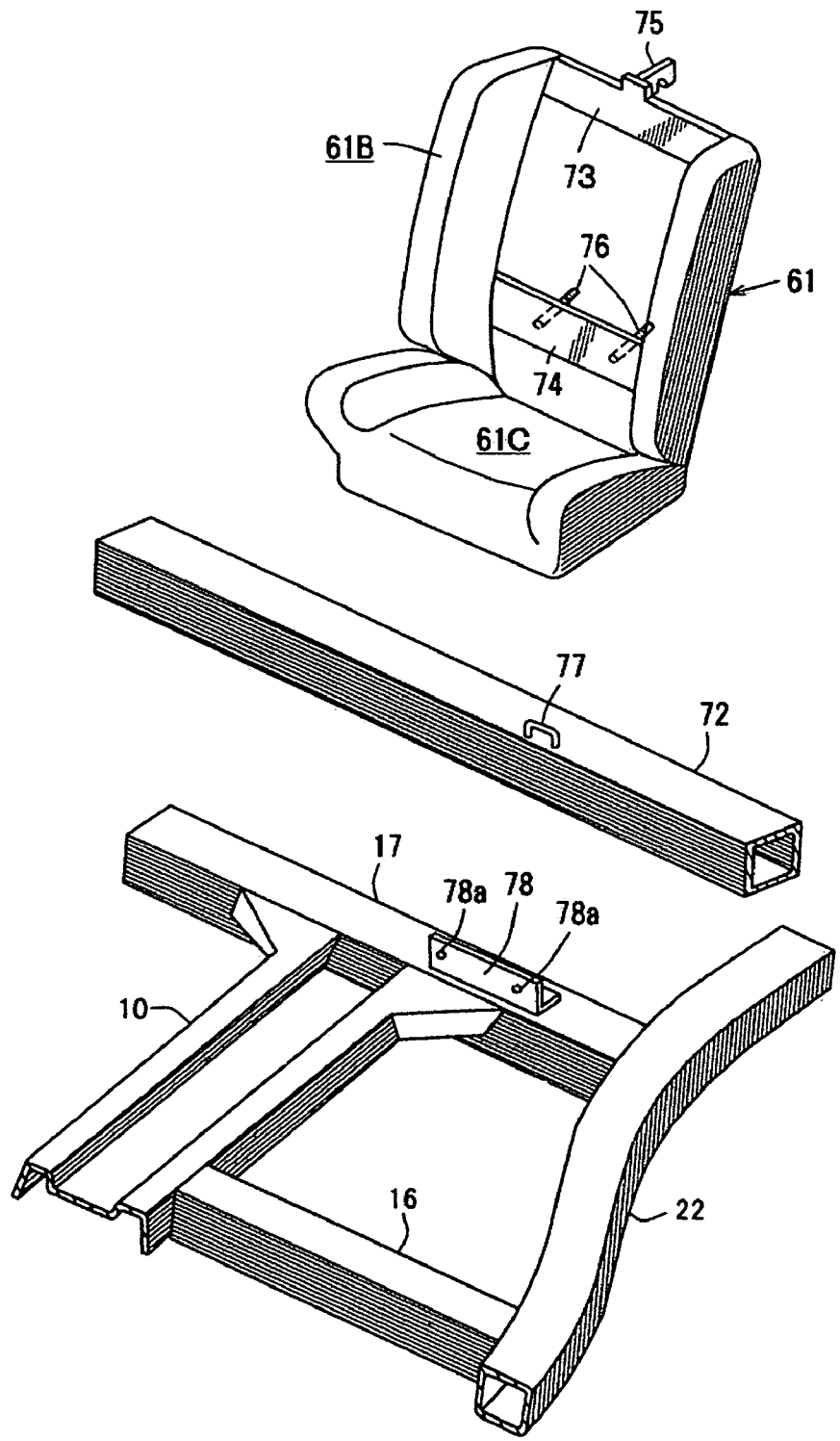
FIG. 12 is an exploded perspective view showing one example of modification of the second-seat mounting structure.
Figure 13:
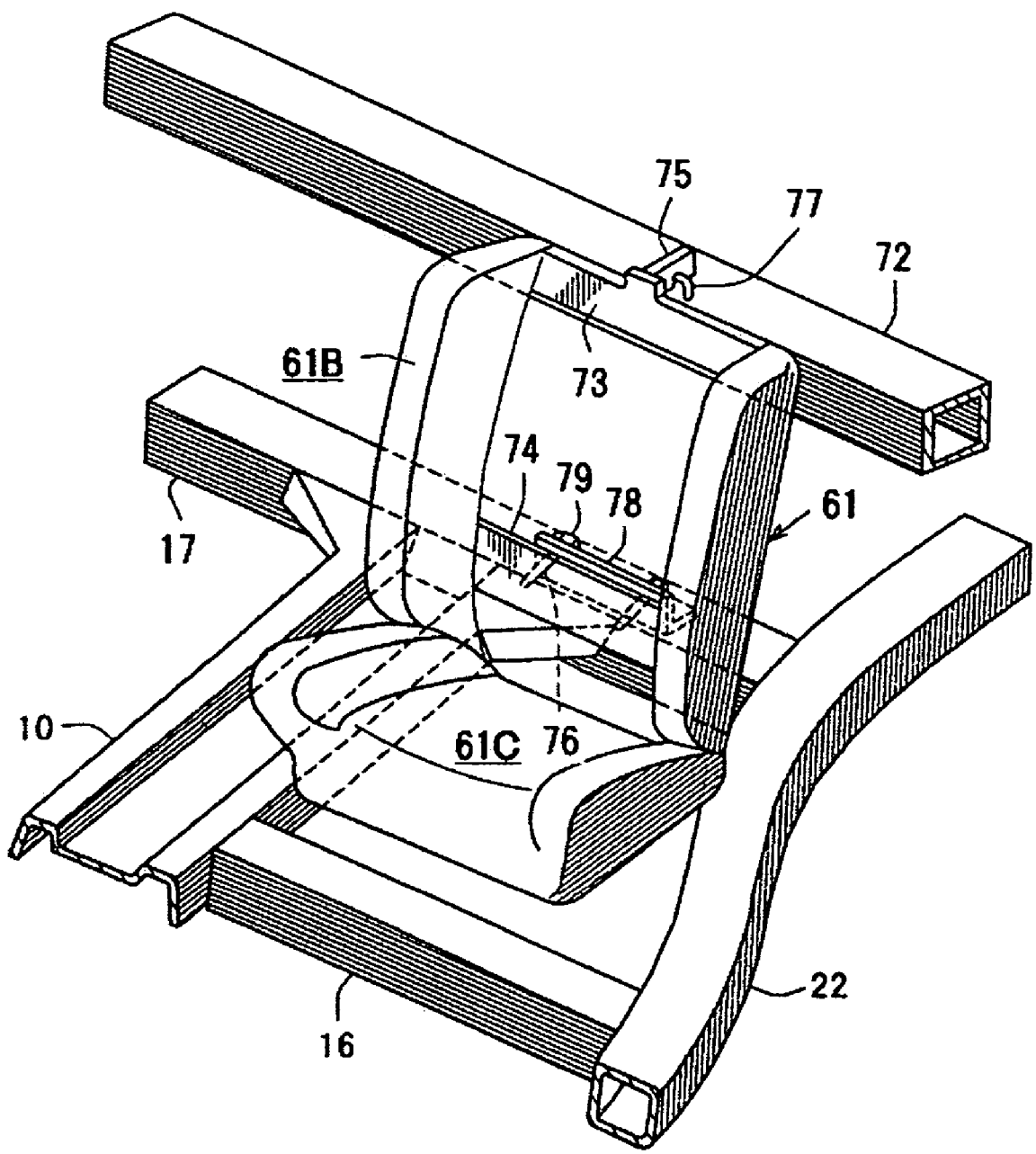
FIG. 13 is a perspective view showing the second-seat mounting structure in FIG. 12.

In place of the mounting structure of the child seat 61 illustrated in FIGS. 10 and 11, a mounting structure of the child seat 61 as shown in FIGS. 12 and 13 may be used.

In this structure, two seatback frames 73, 74 are fixed to the seatback 61B of the child seat 61. Further, a latch 75 is attached to the upper seatback frame 73, and two bolts 76 is fixed to the lower backseat frame 74.

A striker 77 is fixed to the deck member 72, and a bracket 78 formed with two bolt insertion holes 78a is fixed to the rear cross member 17.

The child seat 61 is fixed to the vehicle body by engaging the latch 75 with the striker 77 and fastening the bolts 76 inserted into the insertion holes 78a of the bracket 78, by nuts 79, as shown in FIG. 13.

According to the above structure, a large-size interior component (rear seat 60) can be disposed on the first kick-up portion 4, and a small-size interior component (child seat 61) can be disposed on the second kick-up portion 5 having a larger height. Further, an auxiliary component (fuel tank 48, middle exhaust pipe 39, pre-silencer 40) can be arranged in the bottom space 46 of the second kick-up portion 5.

As mentioned above, according to the present invention, flexibility of layout and arrangement in a limited vehicle space can be increased to allow for a desirable vehicle design. This makes it possible to satisfy both of a low overall-height compact body and an adequate arrangement of the auxiliary component.

Figure 14:
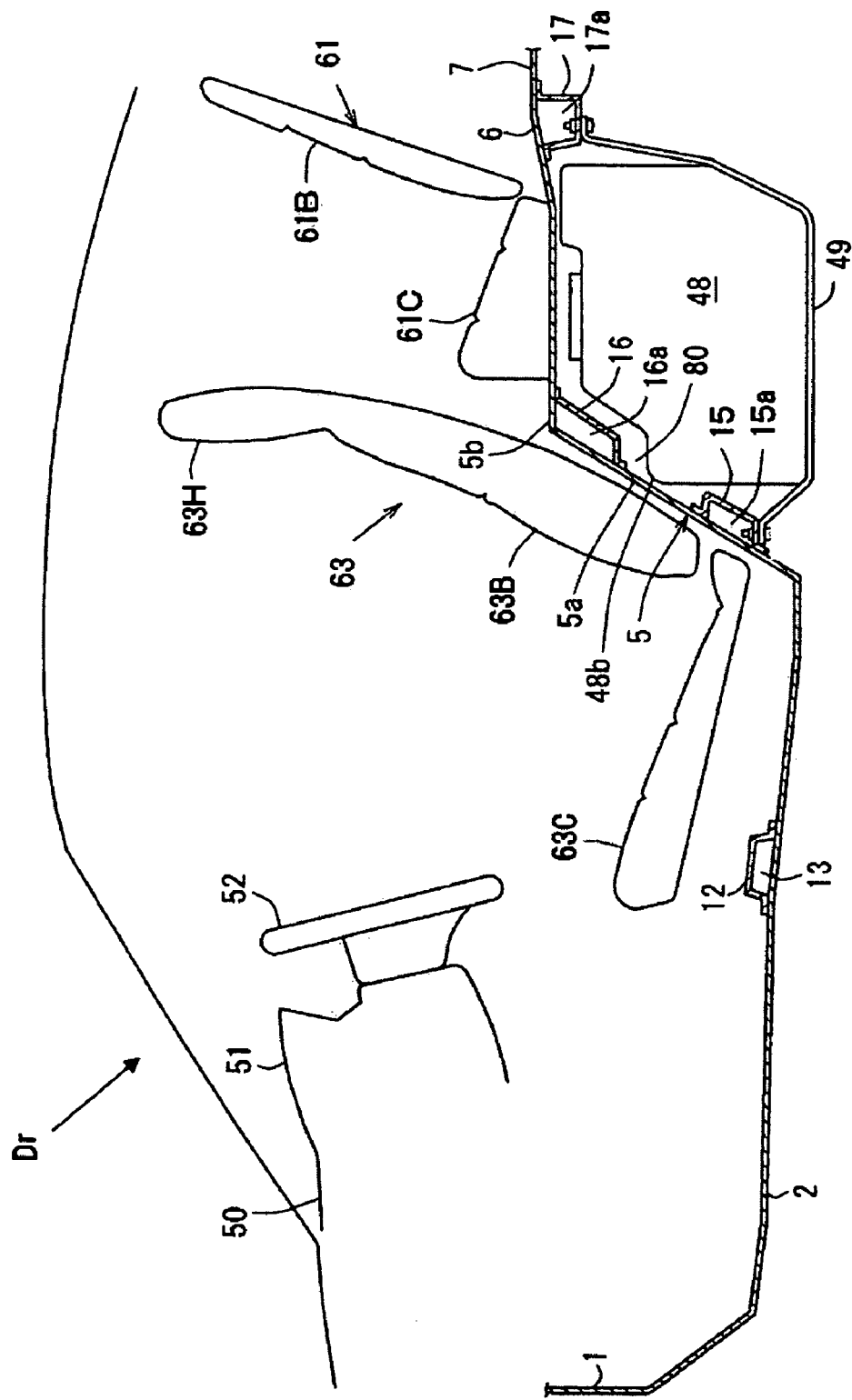
FIG. 14 is a side view showing one example of modification of the auxiliary-component arrangement structure.

While the fuel tank 48 in the above embodiment has a front-low/rear-high slant shape for preventing interference with the lower cross member 15 and the upper cross member 16 as shown in FIG. 1, the fuel tank 48 may be formed with a front protruding portion 48b, and disposed to allow the protruding portion 48b to be located in a space 80 defined between the lower cross member 15 and the upper cross member 16, so as to increase a capacity of the fuel tank 48, as shown in FIG. 14.

Figure 15:
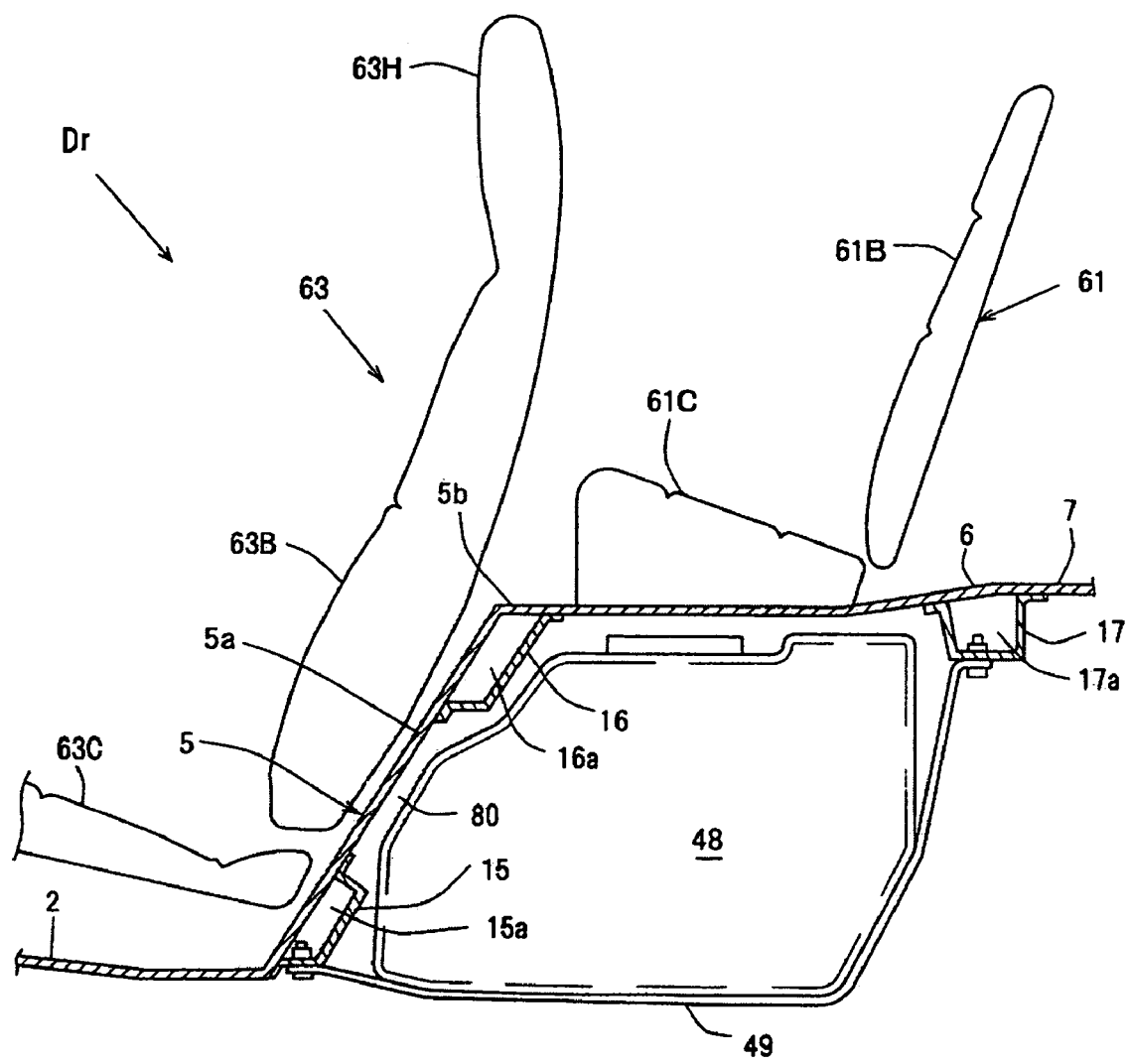
FIG. 15 is a side view showing another example of modification of the auxiliary-component arrangement structure.

Alternatively, as shown in FIG. 15, the lower cross member 15 may be joined to the lowermost end of the rear surface of the second kick-up portion 5, and the fuel tank 48 may be formed to have a front surface approximately conformable to the lower cross member 15, the upper cross member 16 and a portion of the kick-up front wall zone 5a between the lower and upper cross members 15, 16 so as to further increase a capacity of the fuel tank 48.

Figure 16:
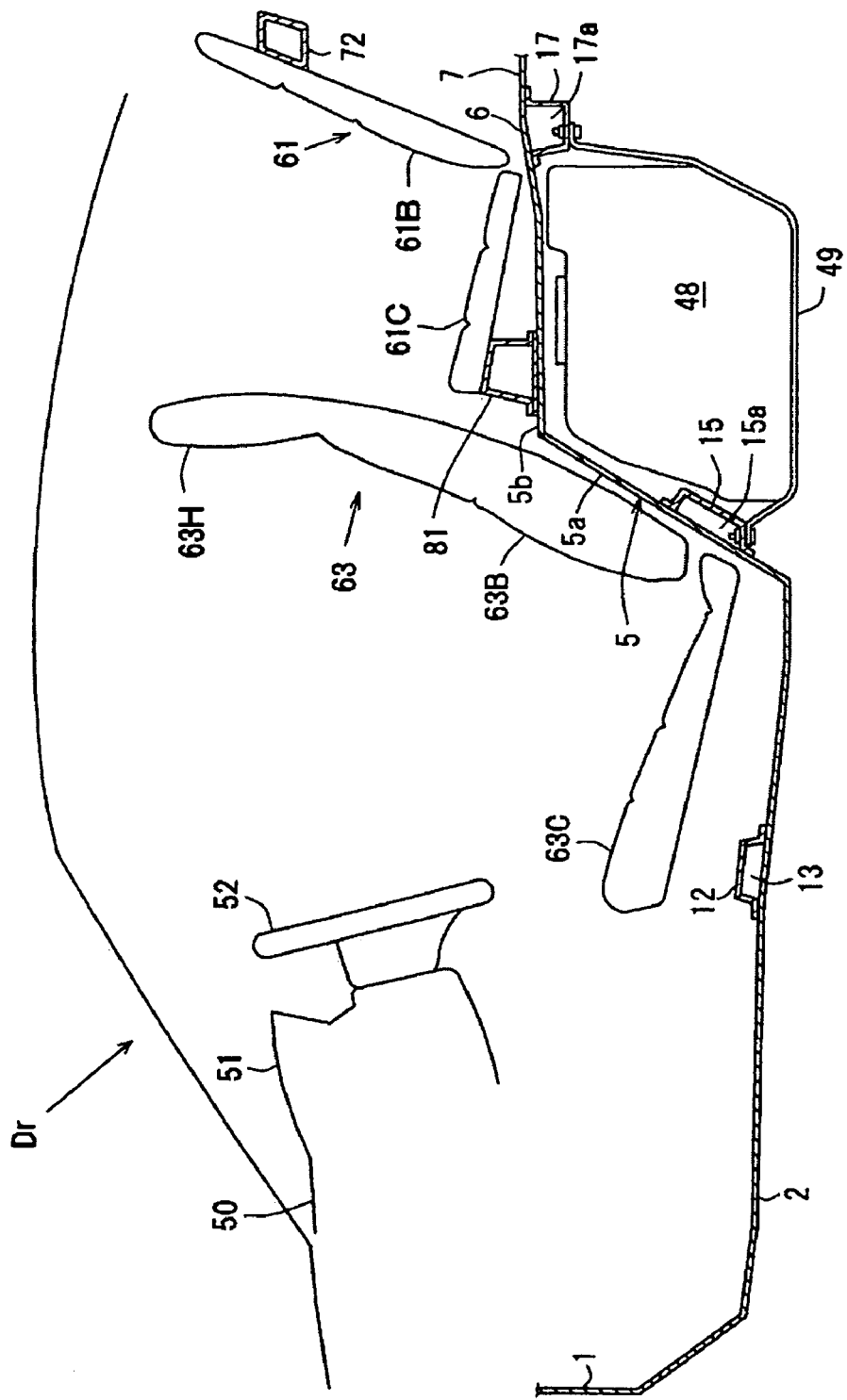
FIG. 16 is a side view showing another example of modification of the second-seat mounting structure.

Alternatively, as shown in FIG. 16, the upper cross member 16 may be eliminated, and a child seat frame 81 additionally serving as a reinforcing member may be joined to a bottom surface of a front portion of the seat cushion 61C of the child seat 61 and a top surface of the kick-up floor zone 5b so as to further increase a capacity of the fuel tank 48. In this case, the child seat frame 81 is preferably formed in a closed-section structure and disposed to extend between the tunnel member 10 and the rear side frame 21 so as to ensure mounting rigidity for the child seat 61.

Figure 17:
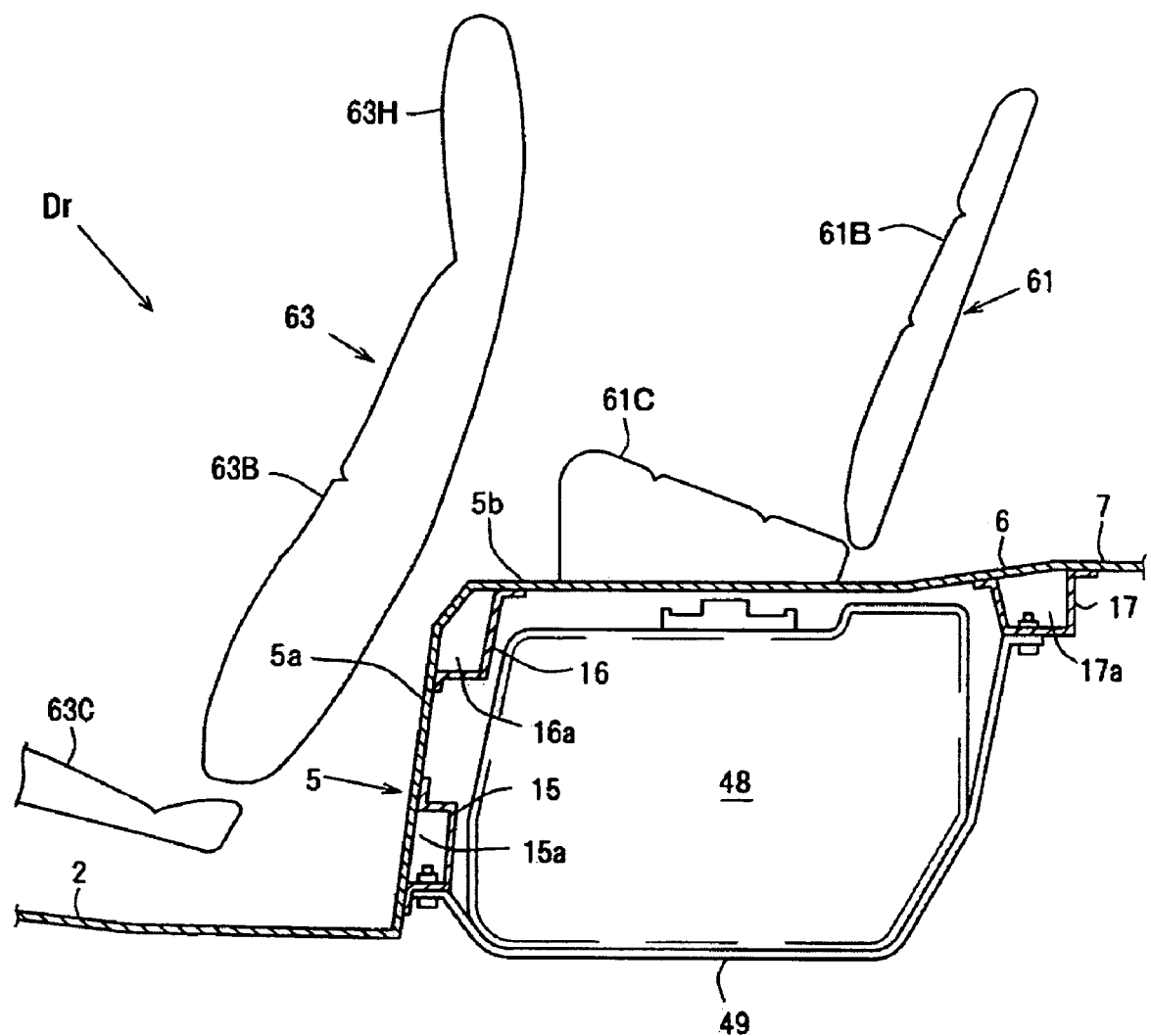
FIG. 17 is a side view showing yet another example of modification of the second-seat mounting structure.

Further, as shown in FIG. 17, the kick-up portion 5 may be stepped upward from a rear edge of the floor panel 2 at approximately right angle.

In this case, an auxiliary component, such as the catalytic converter, may be additionally arranged in the bottom space 46 of the kick-up portion 5 in addition to the fuel tank etc.

With reference to the drawings, a second embodiment of the present invention will be described below.

Figure 18:
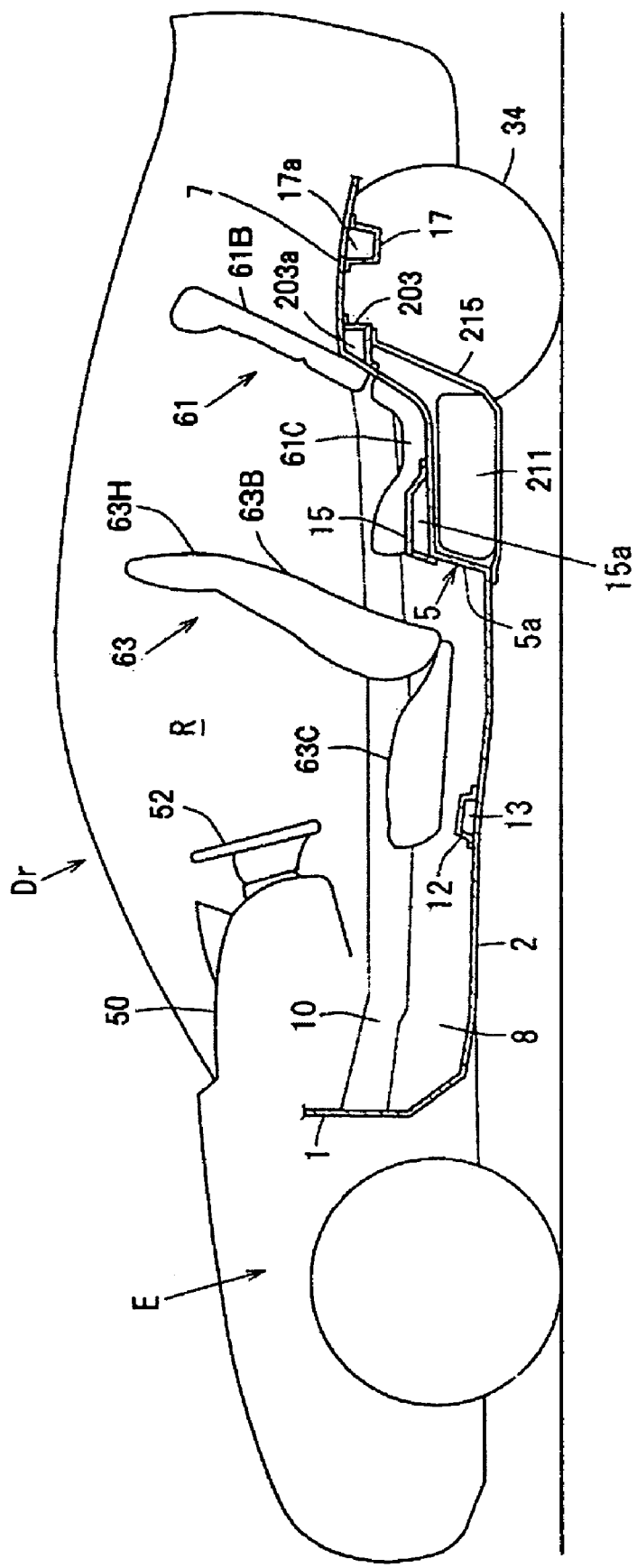
FIG. 18 is a side view showing an arrangement structure for an auxiliary component of a vehicle, according to a second embodiment of the present invention, viewed from the side of a driver's seat.
Figure 19:
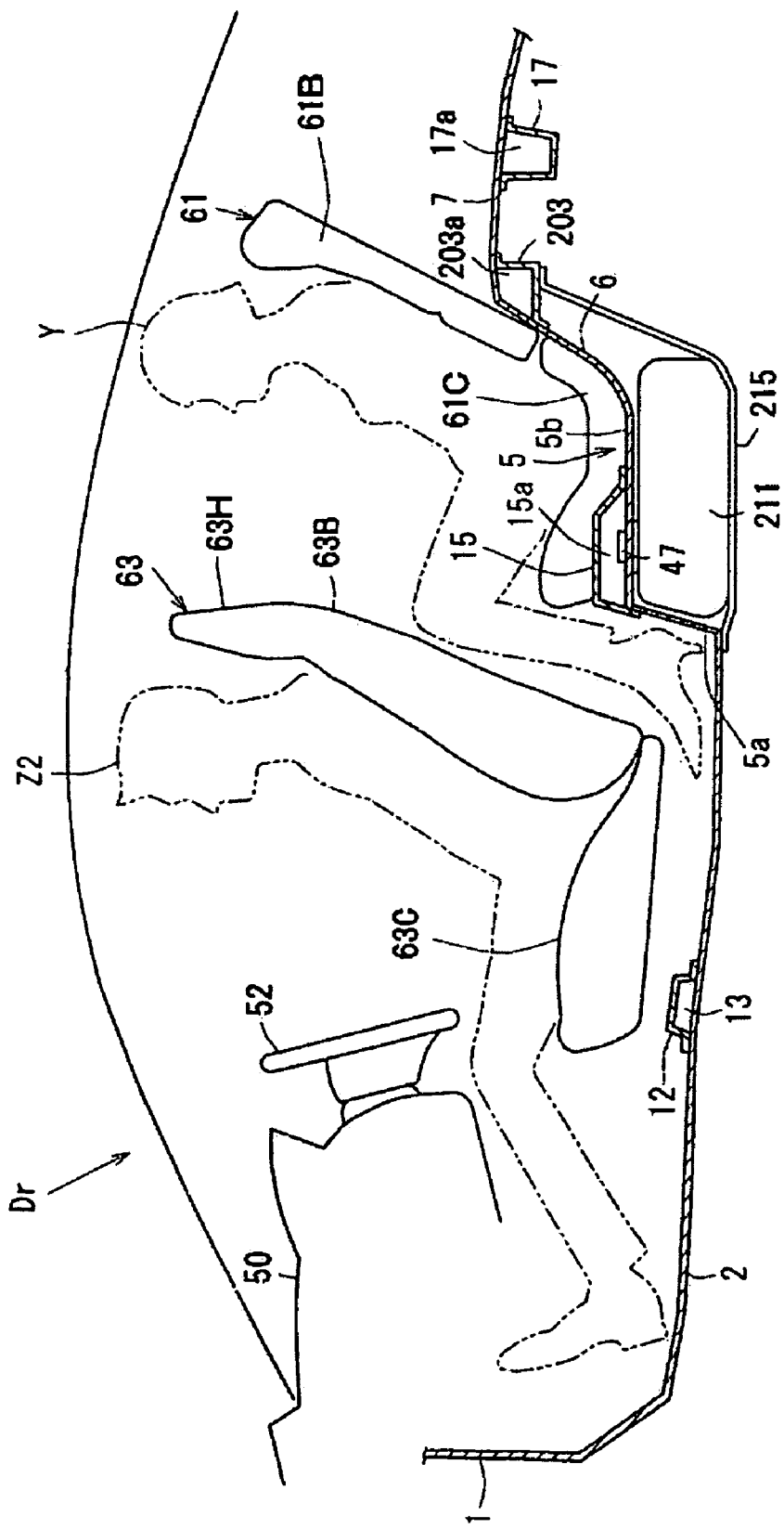
FIG. 19 is a detail view showing the auxiliary-component arrangement structure in FIG. 18.
Figure 20:
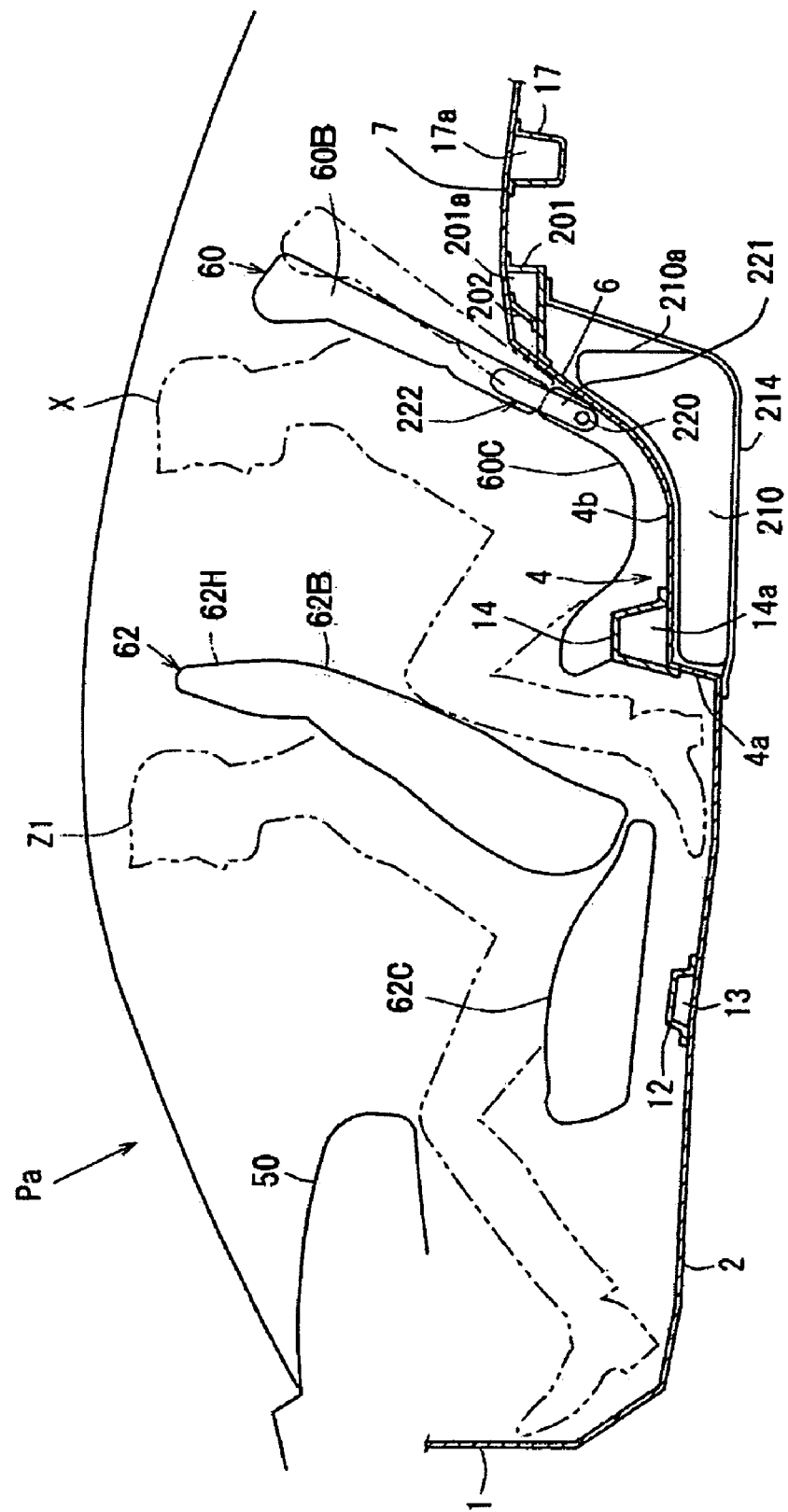
FIG. 20 is a side view showing the auxiliary-component arrangement structure in FIG. 18, viewed from the side of a front passenger seat.
Figure 21:
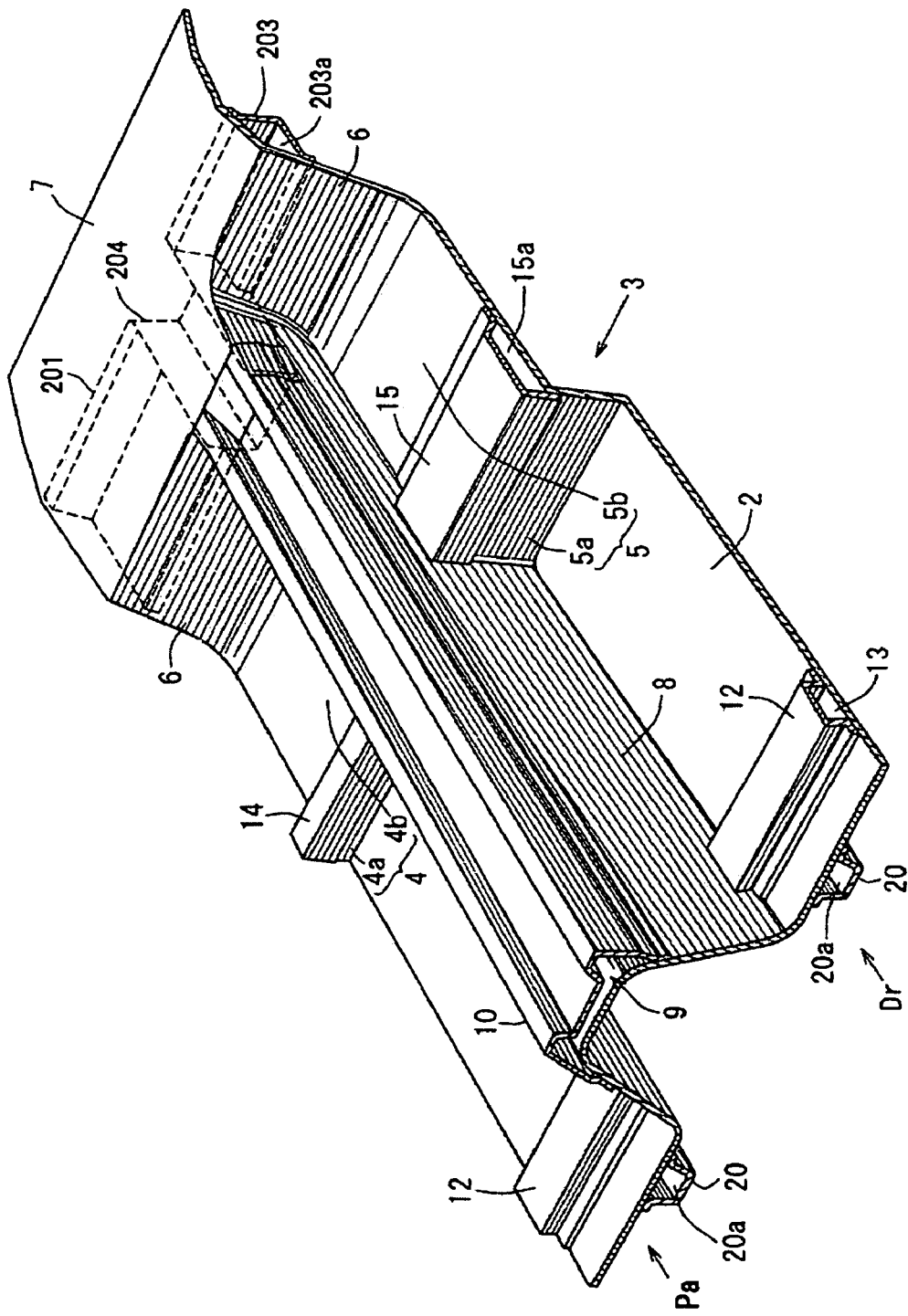
FIG. 21 is a perspective view showing a lower body structure of the vehicle in FIG. 18.

FIG. 18 is a side view showing an arrangement structure for an auxiliary component of a vehicle, according to the second embodiment, viewed from the driver's-seat side Dr, and FIG. 19 is a detail view showing the auxiliary-component arrangement structure in FIG. 18. FIG. 20 is a side view showing the auxiliary-component arrangement structure in FIG. 18, viewed from the front-passenger-seat side Pa. FIG. 21 is a perspective view showing a floor panel 2, and FIG. 22 is a top plan view showing a passenger compartment of the vehicle in FIG. 18.

As with the first embodiment, a bottom surface of a passenger compartment R is defined by the floor panel 2. The floor panel 2 has a rear region formed as a first kick-up portion 4 on the front-passenger-seat side Pa and a second kick-up portion 5 on the driver's-seat side Dr, and the second kick-up portion 5 is formed to have a height greater than that of the first kick-up portion 4.

The first kick-up portion 4 has a front wall zone 4a and a kick-up floor zone 4b, and the second kick-up portion 5 has a front wall zone 5a and a kick-up floor zone 5b. Further, a rear floor 7 continuously extends from respective rear edges of the kick-up floor zones 4b, 5b through a rear kick-up portion 6.

Figure 22:
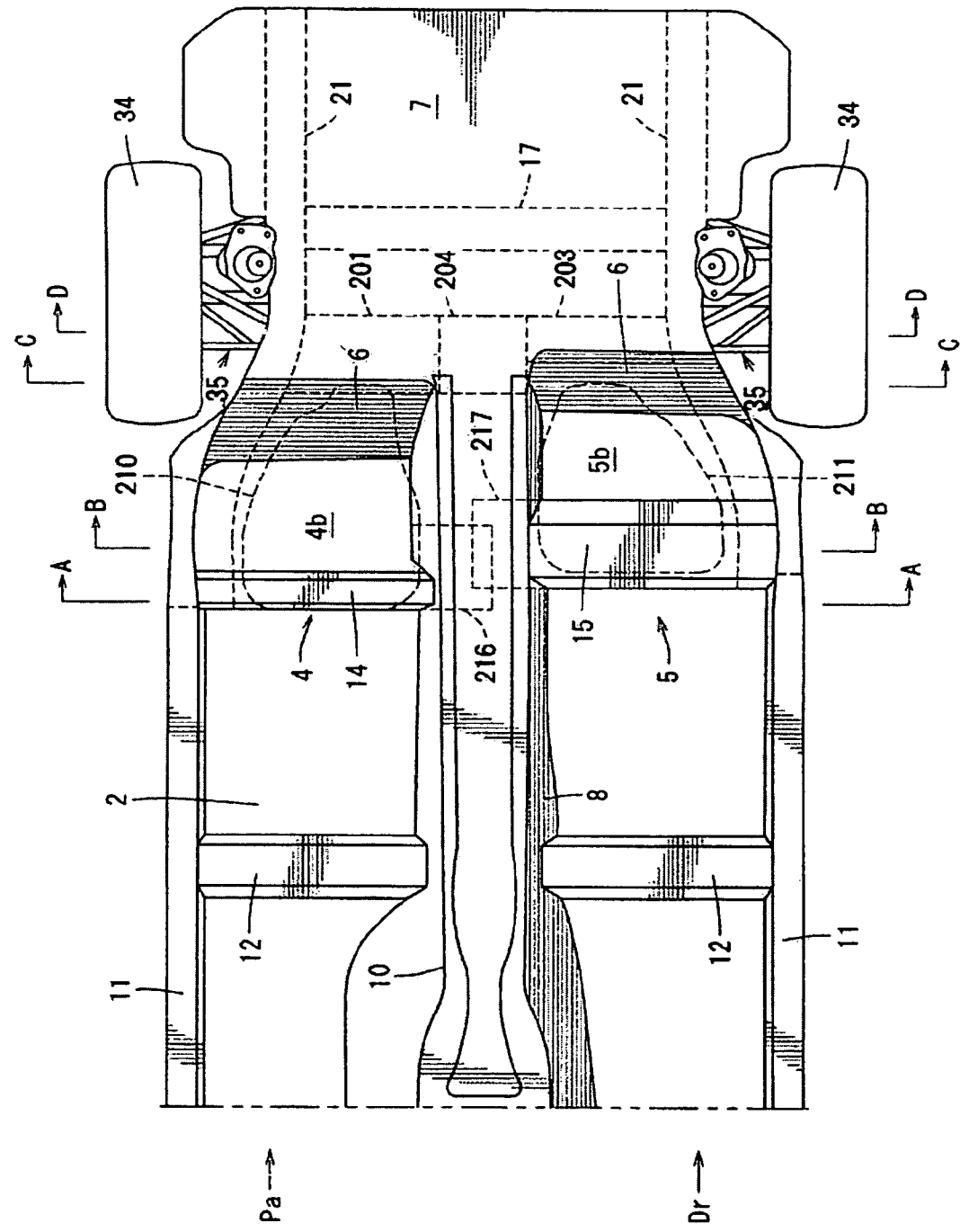
FIG. 22 is a top plan view showing a passenger compartment of the vehicle in FIG. 18.

In this embodiment, as shown in FIG. 22, the first kick-up portion 4 is displaced relative to the second kick-up portion 5 in a frontward direction of a vehicle body.

Further, in the second embodiment, the floor panel 2a has tunnel portion 8, a tunnel member 10, a pair of side sills 11 and a pair of cross members 12, as with the first embodiment.

As shown in FIGS. 19 to 21, in this embodiment, a lower cross member 14 is joined to a top surface of the first kick-up portion on the front-passenger-seat side Pa, and a laterally-extending closed section 14a is formed between the lower cross member 14 and the top surface of the first kick-up portion. Further, a lower cross member 15 is joined along a top surface of the second kick-up portion on the driver's-seat side Dr, and a laterally-extending closed section 15a is formed between the lower cross member 15 and the top surface of the second kick-up portion. Each of the lower cross members 14, 15 is located inside the passenger compartment, and connected and fixed to the tunnel portion 8.

As shown in FIGS. 21 and 22, the lower cross member 14 on the front-passenger-seat side Pa is displaced relative to the lower cross member 15 on the driver's-seat side Dr in the frontward direction of the vehicle body.

In this embodiment, as shown in FIGS. 20 and 21, a cross member 201 is joined along a corner region defined between the rear floor 7 and the rear kick-up portion 6 on the front-passenger-seat side Pa, in the lateral direction, and a laterally-extending closed section 201a is formed by the rear kick-up portion 6, the rear floor 7 and the cross member 201. An approximately Z-shaped node member 202 is disposed within the closed section 201a while being joined to the rear floor 7 and the cross member 201.

As shown in FIGS. 18, 19 and 21, a cross member 203 is joined along a corner region defined between the rear floor 7 and the rear kick-up portion 6 on the driver's-seat side Dr, in the lateral direction, and a laterally-extending closed section 203a is formed by the rear kick-up portion 6, the rear floor 7 and the cross member 203.

Each of the cross members 201, 203 is a body-rigidifying member extending in the lateral direction on the rearward side relative to a kick-up area 3. In this embodiment, as shown in FIGS. 21 and 22, an front end of the cross member 201 on the front-passenger-seat side Pa is displaced relative to a front end of the cross member 203 on the side of the driver's seat side Dr in the frontward direction of the vehicle body.

A rear cross member 17 is joined to the rear floor 7 on the rearward side relative to the cross members 201, 203 to extend between a pair of right and left after-mentioned rear side frames 21 in the lateral direction so as to be connected to each of the rear side frames 21, and a laterally extending closed section 17a is formed between the rear cross member 17 and the rear floor 7.

As shown in FIG. 21, a pair of right and left floor frames 20 are joined to a bottom surface of the floor panel 2, and a longitudinally-extending closed section 20a is formed between the floor panel 2 and each of the floor frames 20, as with the first embodiment.

Figure 23:
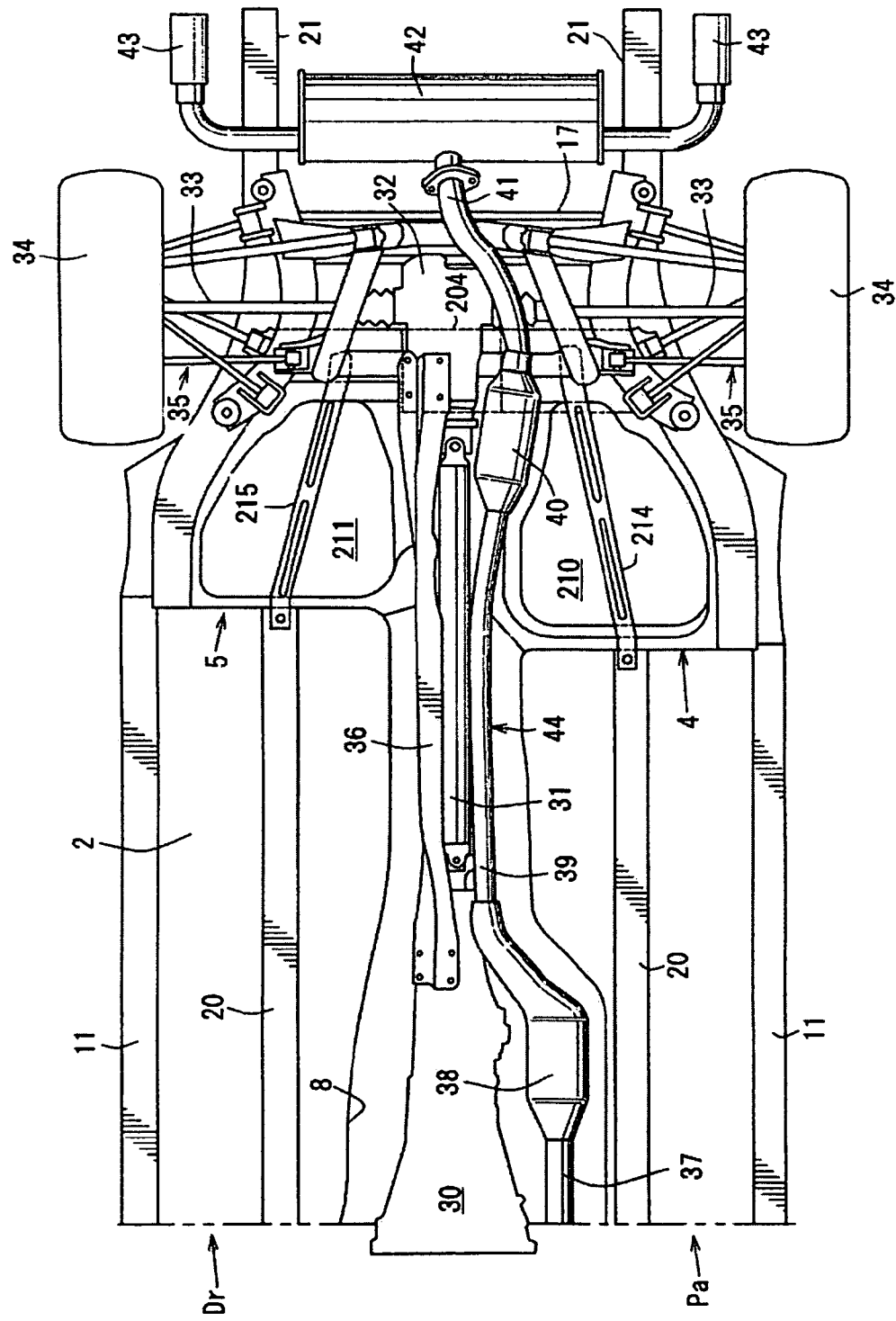
FIG. 23 is a fragmentary bottom view of the vehicle in FIG. 18.

As shown in the bottom view of FIG. 23, a transmission 30, a propeller shaft 31, a differential unit 32, right and left rear drive shafts 33, right and left rear wheels 34, a rear suspension 35, a power plant frame 36, and an exhaust pipe 44 including a front exhaust pipe 37, a catalytic converter 38, a middle exhaust pipe 39, a pre-silencer 40, a rear exhaust pipe 41, a main silencer 42 and a tail-pipe 43, are arranged on the side of the bottom surface of the floor panel 2, as with the first embodiment.

Figure 24:
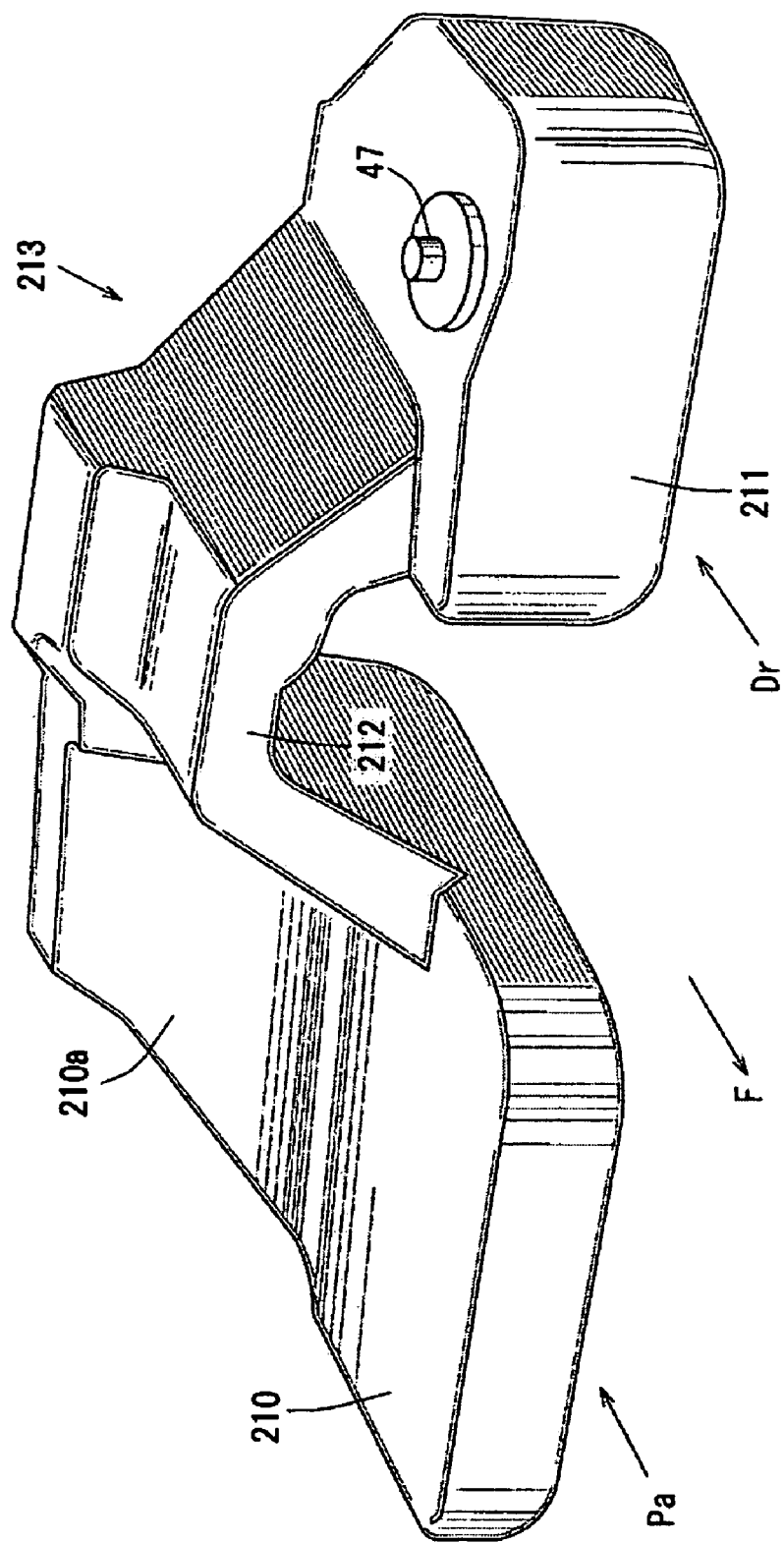
FIG. 24 is a perspective view showing a fuel tank of the vehicle in FIG. 18.

As shown in FIG. 18 to 20 and FIGS. 22 and 23, a sub-tank (first fuel tank) 210 serving as a first auxiliary component of the vehicle is arranged below the first kick-up portion 4, and a main tank (second fuel tank) 211 having a height greater than that of the sub-tank 210 and serving as a second auxiliary component of the vehicle is arranged below the second kick-up portion 5. FIG. 24 is a perspective view of the sub-tank 210 and the main tank 211. As shown in FIG. 24, the sub-tank 210 and the main tank 211 are fluidically connected to one another through an approximately gate-shaped or tunnel-shaped tank member 212 standing upward and extending in the lateral direction. The sub-tank 210, the main tank 211 and tunnel-shaped tank member 212 are integrated as a single of asymmetric saddle-shaped fuel tank 213. This fuel tank 213 is supported by the vehicle body through two tank bands 214, 215, as shown in FIGS. 18 to 20.

The sub-tank 210 has a rear portion integrally formed with a raised portion 210a extending upward along a rear surface of the rear kick-up portion 6, so as to increase a capacity of the fuel tank.

The main tank 211 includes a fuel pump 47 attached to an upper portion thereof.

Figure 25:
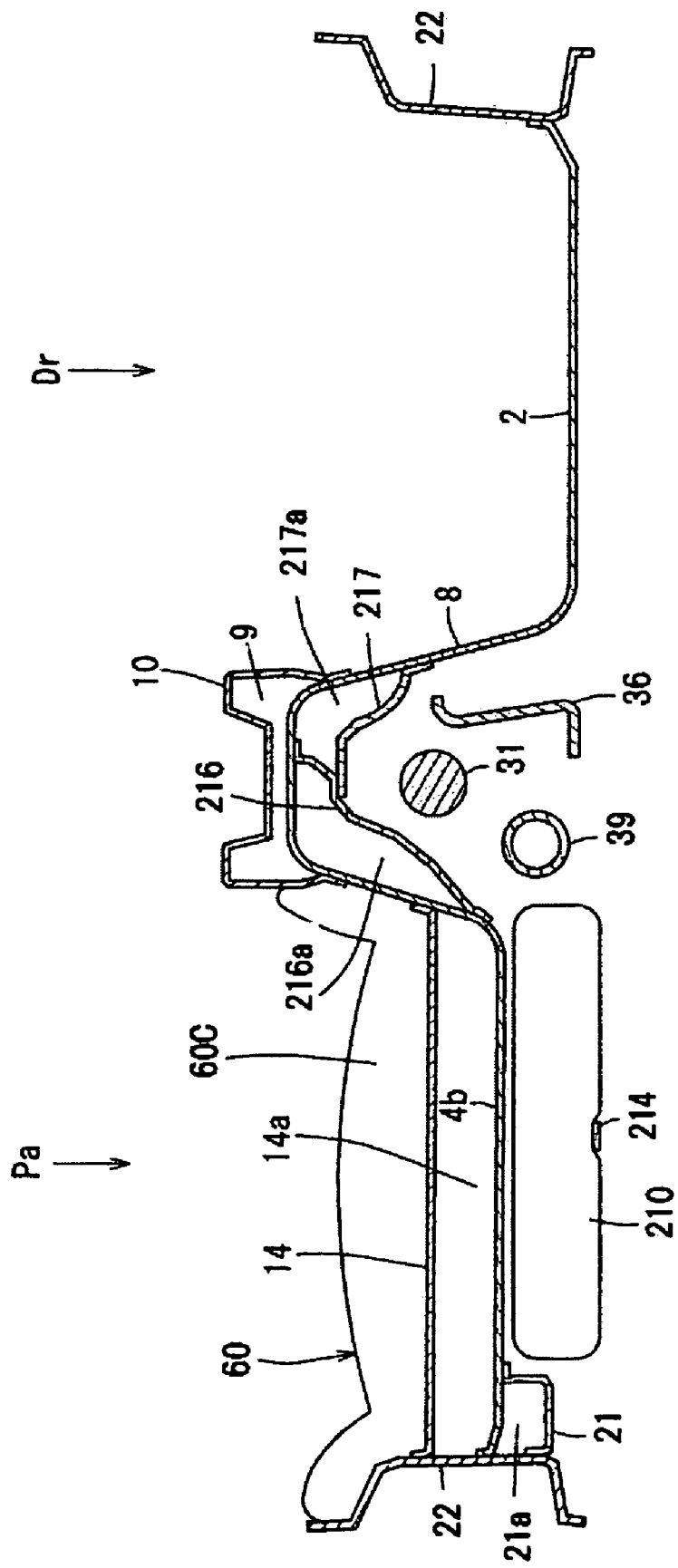
FIG. 25 is a sectional view taken along the line A-A in FIG. 22.
Figure 26:
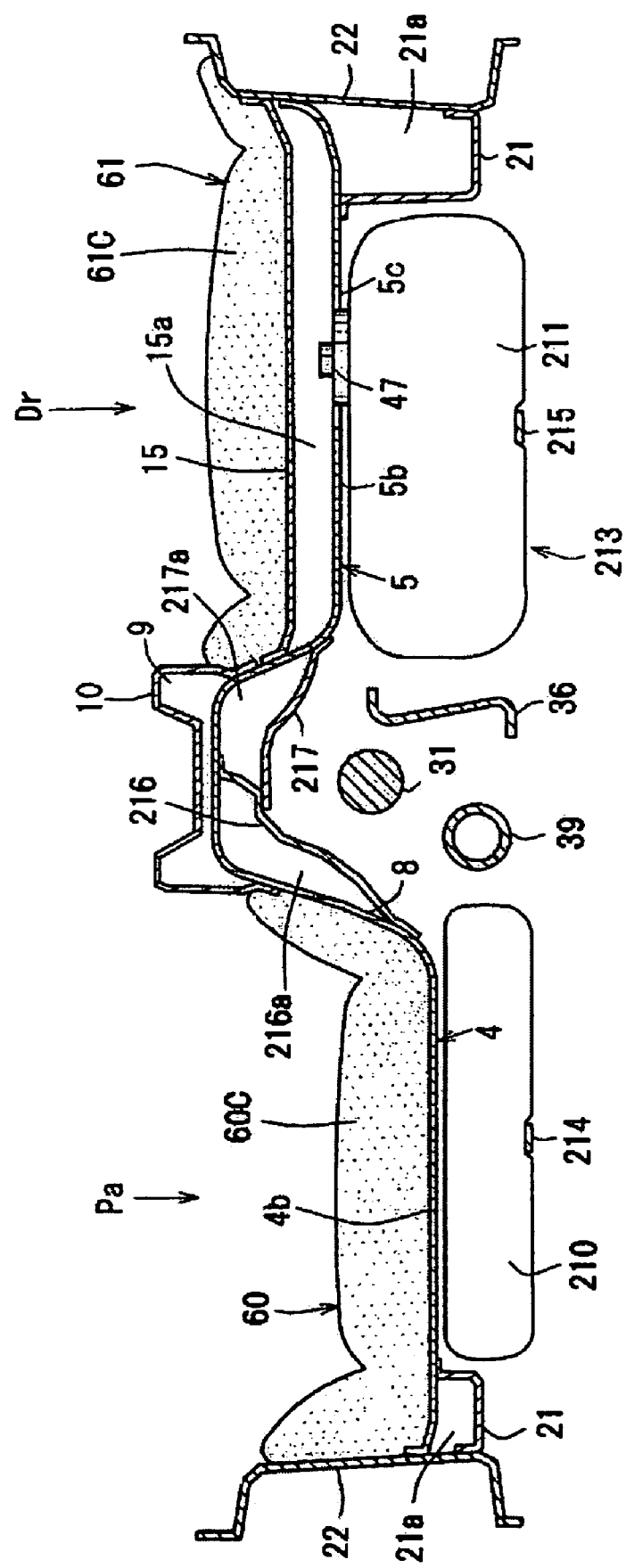
FIG. 26 is a sectional view taken along the line B-B in FIG. 22.
Figure 27:
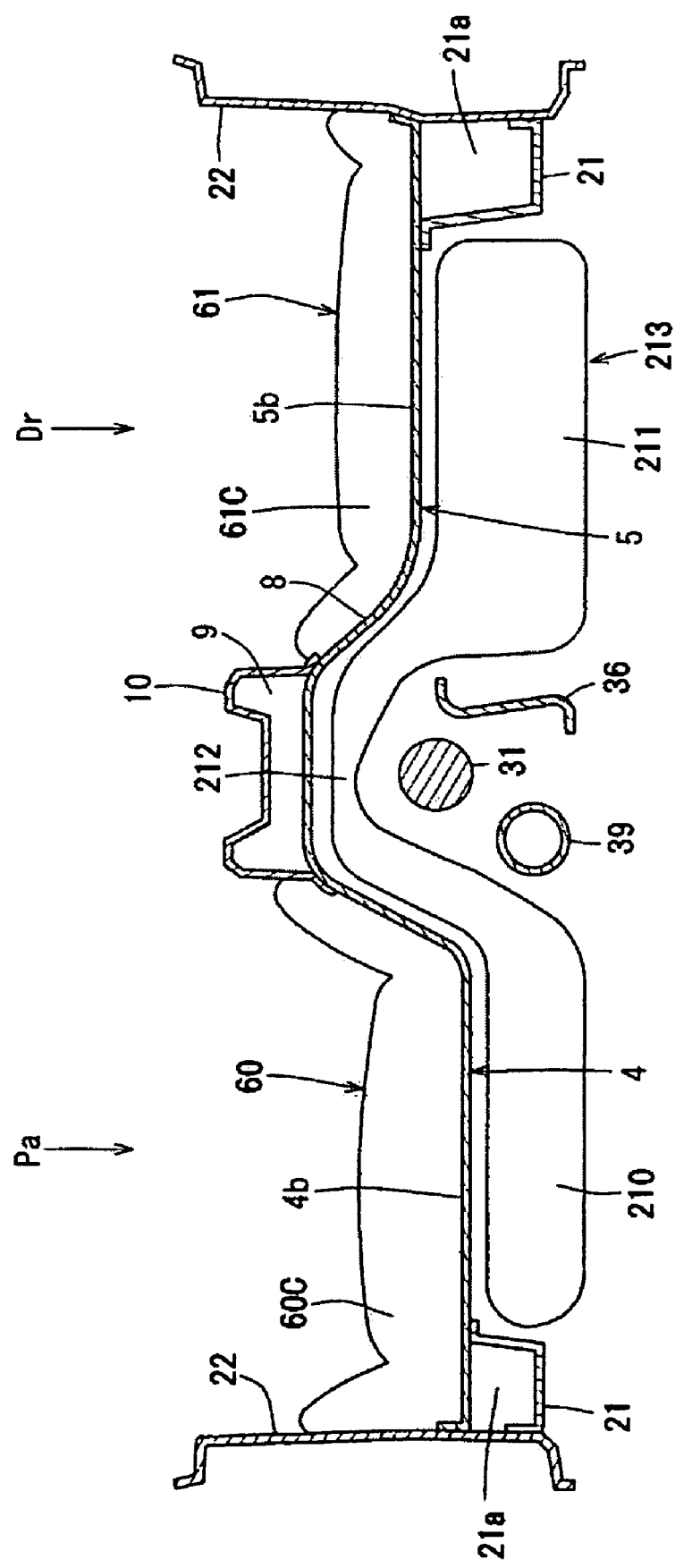
FIG. 27 is a sectional view taken along a line across approximately the center of a tunnel-shaped tank member in FIG. 22.
Figure 28:
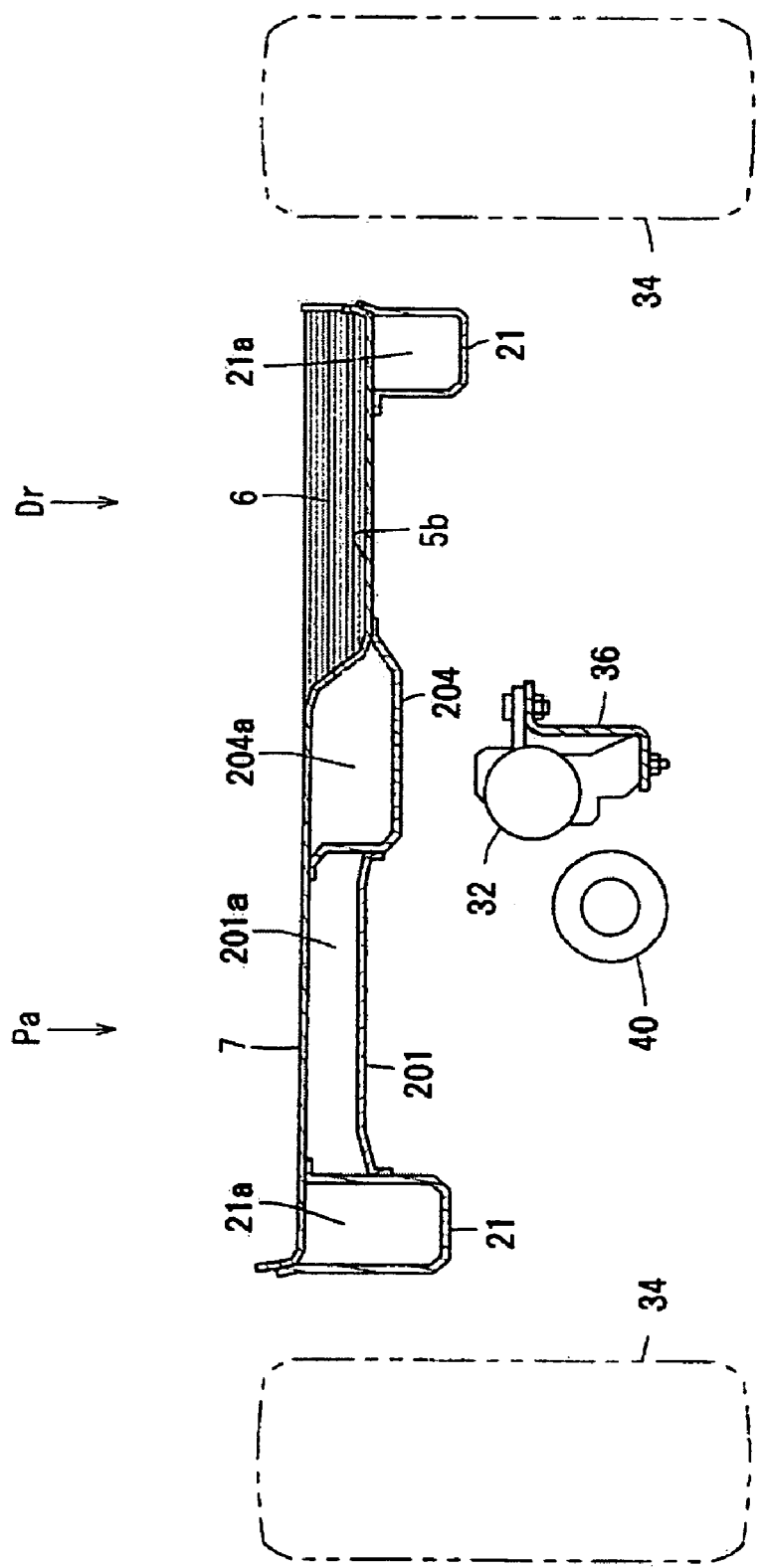
FIG. 28 is a sectional view taken along the line C-C in FIG. 22.
Figure 29:
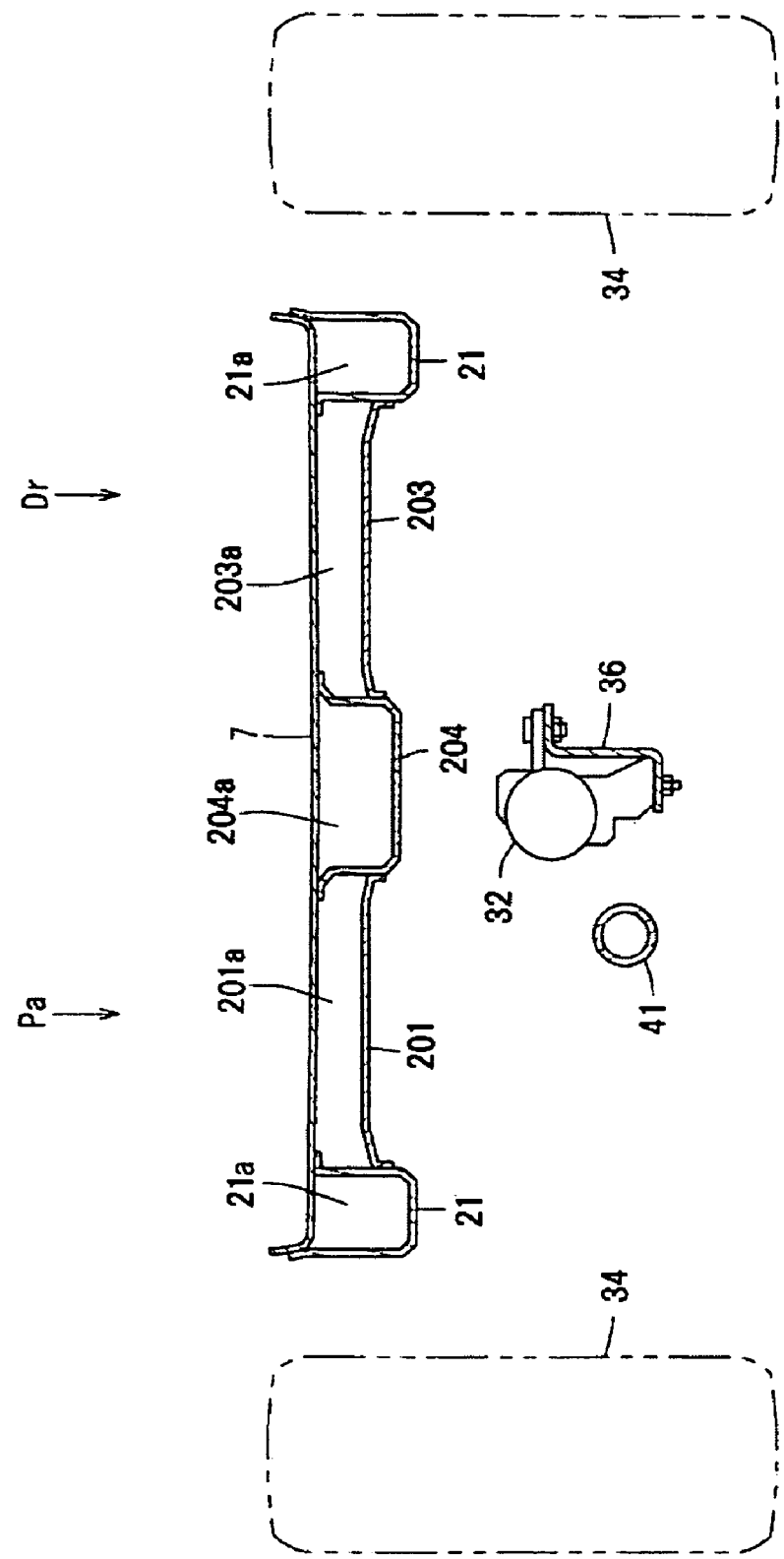
FIG. 29 is a sectional view taken along the line D-D in FIG. 22.

FIG. 25 is a sectional view taken along the line A-A in FIG. 22, and FIG. 26 is a sectional view taken along the line B-B in FIG. 22. FIG. 27 is a sectional view taken along a line across approximately the center of the tunnel-shaped tank member 212. FIG. 28 is a sectional view taken along the line C-C in FIG. 22, and FIG. 29 is a sectional view taken along the line D-D in FIG. 22.

As shown in FIG. 26, the fuel pump 47 is partially inserted into and arranged in an inner space of the closed section 15a of the lower cross member 15 joined to a front region of the second kick-up potion 5.

Figure 41:
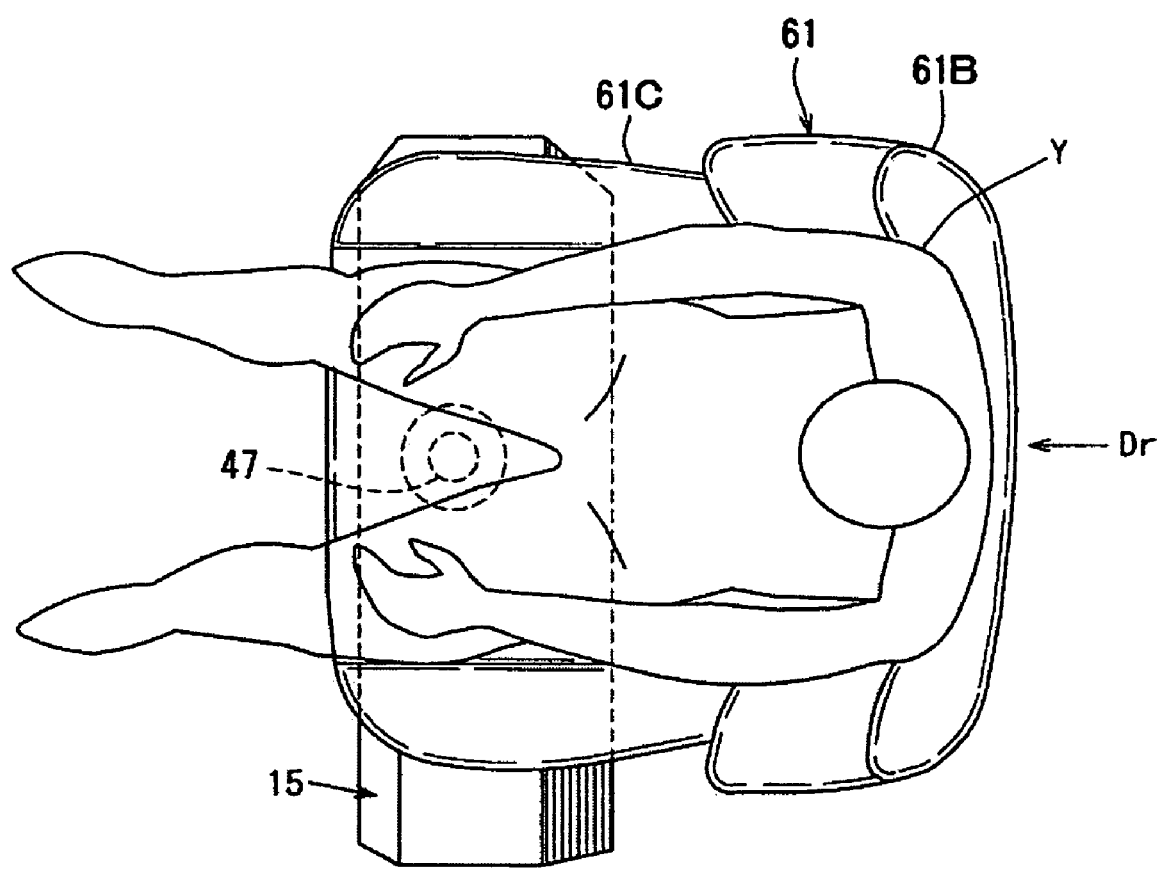
FIG. 41 is a fragmentary top plan view showing a relationship between a passenger seated in a rear seat and a fuel pump in the auxiliary-component arrangement structure in FIG. 38.

Further, this fuel pump 47 is disposed at a position corresponding to the center of a seat cushion 61C of an after-mentioned second rear seat 61 (see FIG. 41). The kick-up floor zone 5b of the second kick-up portion 5 is formed with an opening 5c for receiving the fuel pump 47.

As shown in FIGS. 25 to 29 and FIG. 23, a pair of right and left rear side frames 21 as body-rigidifying members are joined, respectively, to respective bottom surfaces of opposite side ends of the rear floor 7. Each of the rear side frames 21 extends frontward up to a rear end of a corresponding one of the side sills.

As shown in FIGS. 25, 26 and 27, a rear side inner panel 22 is fixedly joined to a laterally outer end of each of the first and second kick-up portions 4, 5.

Further, as shown in FIG. 22, the lower cross member 14 on the front-passenger-seat side Pa is displaced frontward relative to the lower cross member 15 on the driver's-seat side Dr. Thus, the lower cross member 14 on the front-passenger-seat side Pa and the lower cross member 15 on the driver's-seat side Dr are reinforced by connecting respective adjacent ends of these lower cross members 14, 15 together through two connecting members 216 and 217, as shown in FIGS. 25 and 26. The connecting members 216, 217 are disposed in the tunnel portion 8, as shown in the sectional views of FIGS. 25 and 26.

As indicated by the broken lines in FIG. 22, the connecting members 216, 217 overlap with one another in the longitudinal direction, and additionally overlap with the cross members 14, 15.

As shown in FIG. 26, the connecting member 216 is joined to the tunnel portion 8, and a closed section 216a is formed between the connecting member 216 and the tunnel portion 8.

The connecting member 217 is joined to the connecting member 216 and the tunnel portion 8, and a closed section 217a is formed between the connecting member 217 and the tunnel portion 8.

Figure 30:
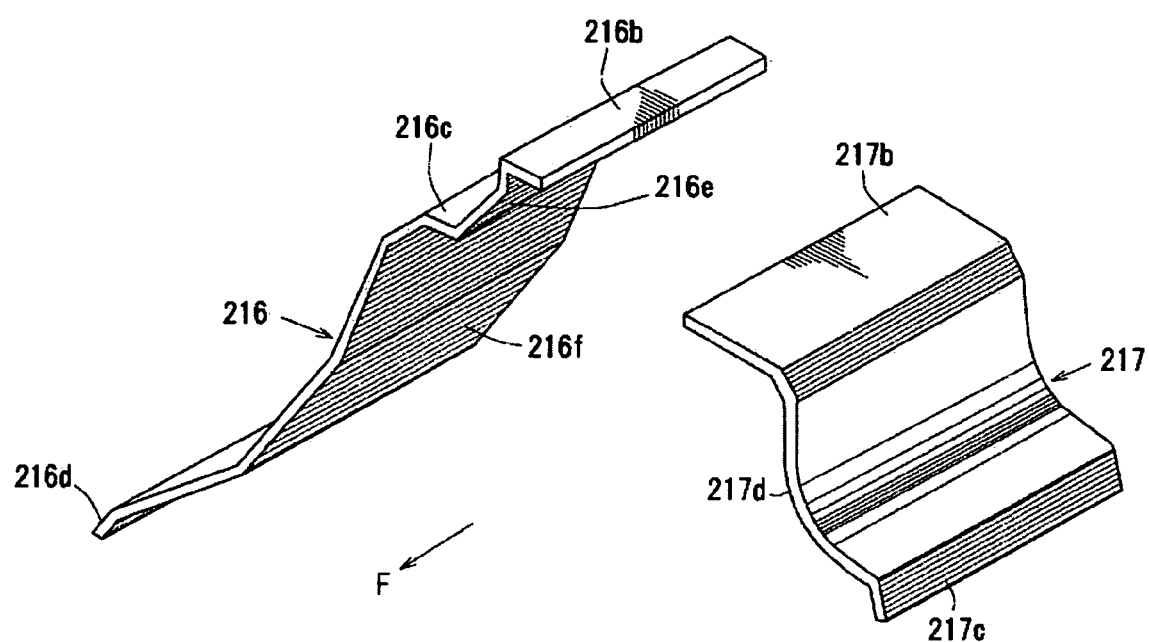
FIG. 30 is an exploded perspective view showing a reinforcing member in FIG. 22.

FIG. 30 is an exploded perspective view showing the reinforcing members 216, 217. As shown in FIG. 30, the connecting member 216 is a metal reinforcing member integrally having an upper joint segment 216b, an vertically-intermediate joint segment 216c, a lower joint segment 216d and connection segments 216e, 216f connecting the vertically-adjacent joint segments together.

The other connecting member 217 is a metal reinforcing member integrally having an upper joint segment 217b, a lower joint segment 217c and a curved-shaped connection the joint segment 217d connecting the vertically-adjacent joint segments 217b, 217c together.

Figure 31:
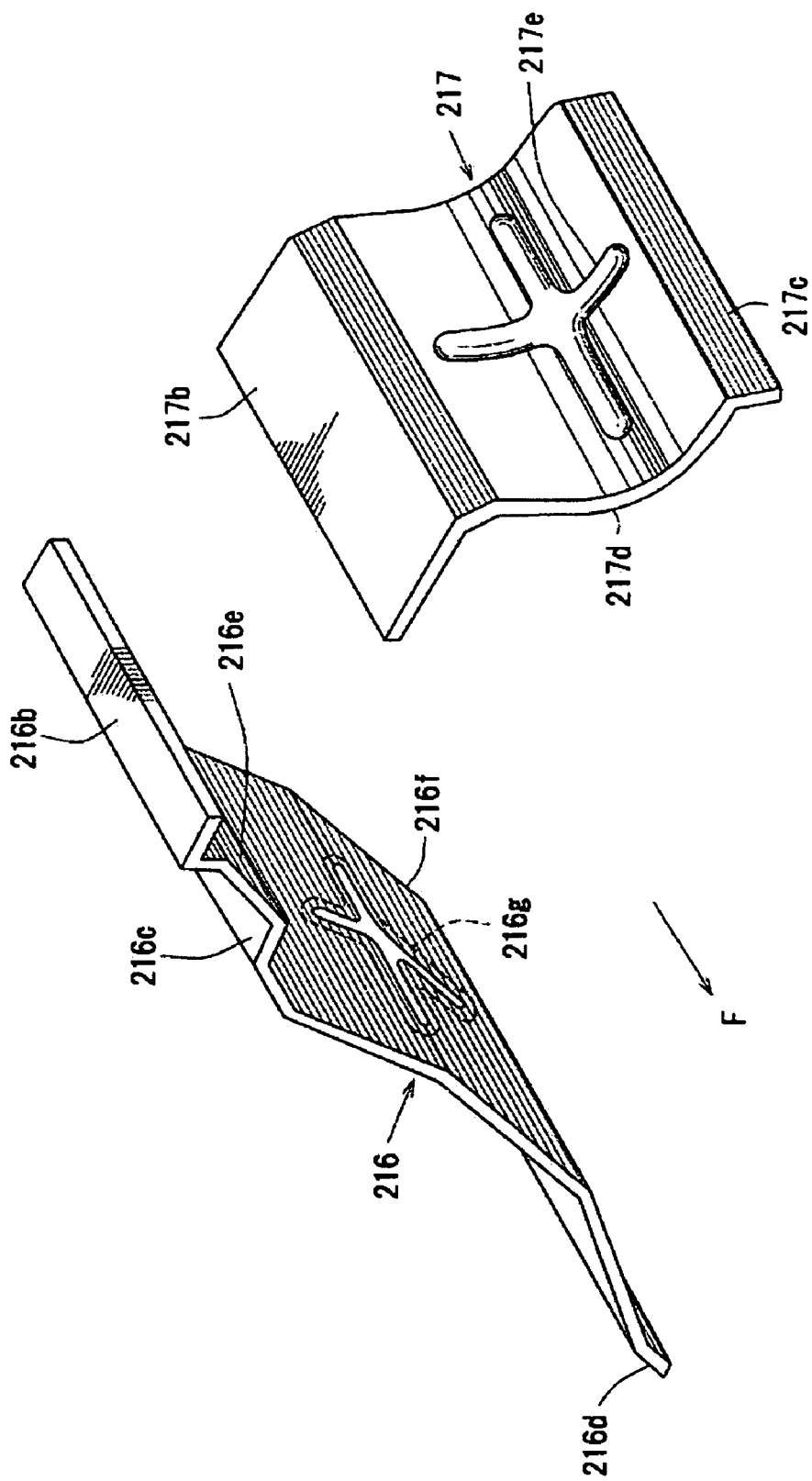
FIG. 31 is an exploded perspective view showing one example of modification of the reinforcing member.

Each of the connecting members 216, 217 may be integrally formed with a bead (216g, 216e) extending at least in the lateral direction (e.g. cross-shaped beads), on a surface facing the closed section, as shown in FIG. 31, so as to provide further enhanced body rigidity and resistance against a side-impact collision.

As shown in FIG. 27, as a third auxiliary component, the middle exhaust pipe 39, the propeller shaft 31 and the power plant frame 36 are arranged below the tunnel-shaped tank member 212 fluidically and mechanically connecting the sub-tank 210 and the main tank 211.

As described in connection with FIG. 22, the front end of the cross member 201 on the front-passenger-seat side Pa is displaced frontward relative to the front end of the cross member 203 on the driver's-seat side Dr, and the cross members 201, 203 are not connected to one another in the lateral direction. Thus, in this embodiment, as shown in FIGS. 28 and 29, the cross members 201, 203 are connected together through a connecting member 204

The connecting member 204 is formed in a concave shape in section, and connected to the bottom surface of the rear floor 7, and a closed section 204a is formed between the rear floor 7 and the connecting member 204. Further, each of the cross members 201, 203 is disposed between the connecting member 204 and a corresponding one of the rear side frames 21 each having a closed section structure.

As shown in FIG. 22, the connecting member 204 has a length approximately equal to that of the cross member 201 which has a longitudinal length greater than that of the cross member 203, so as to serves as a means to connect the cross members 201, 203 to one another.

Figure 32:
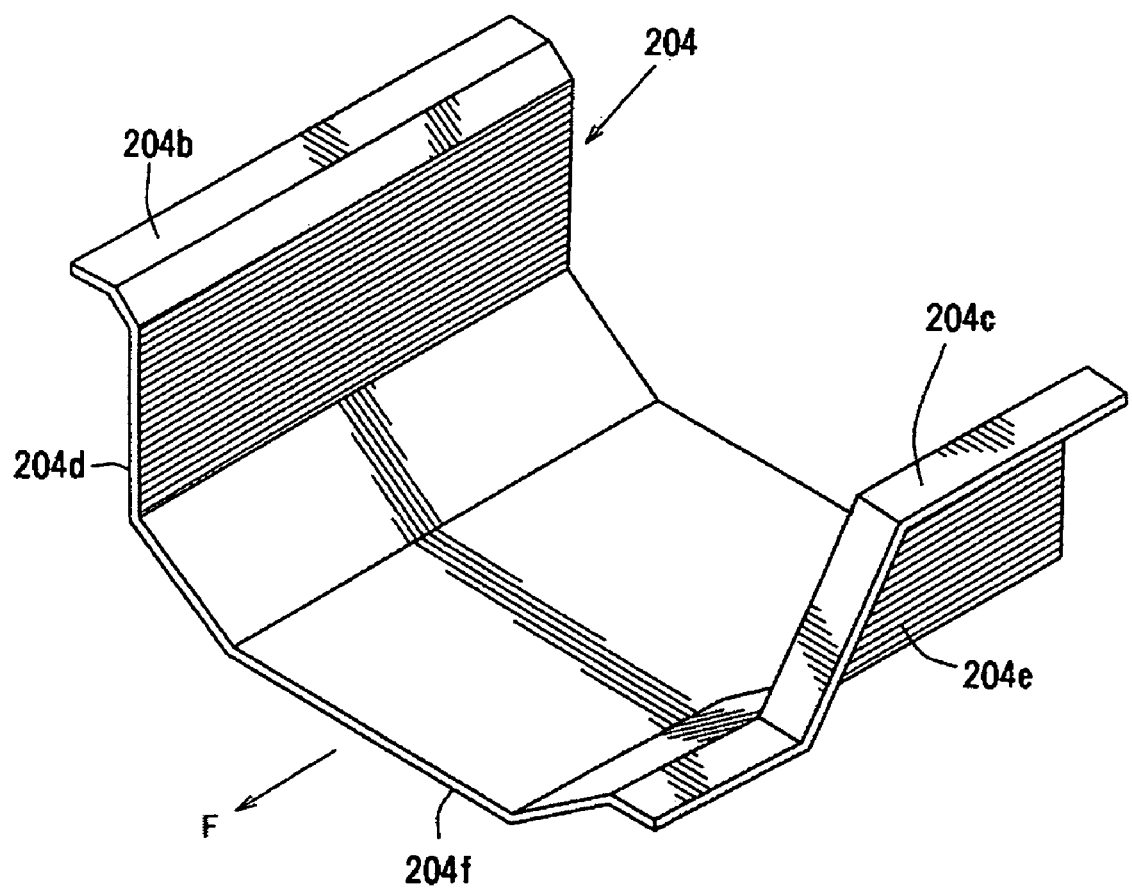
FIG. 32 is a perspective view showing a connecting member in FIGS. 28 and 29.

FIG. 32 is a perspective view of the connecting member 204. As shown in FIG. 32, the connecting member 204 is a metal member integrally having two upper joint segments 204b, 204c, right and left vertical wall segments 204b, 204e and a bottom segment 204f. The joint segment 204c and the vertical wall segment 204e on the driver's-seat side Dr are formed to be compatible to respective shapes of the rear floor 7 and the rear kick-up portion 6.

Figure 33:
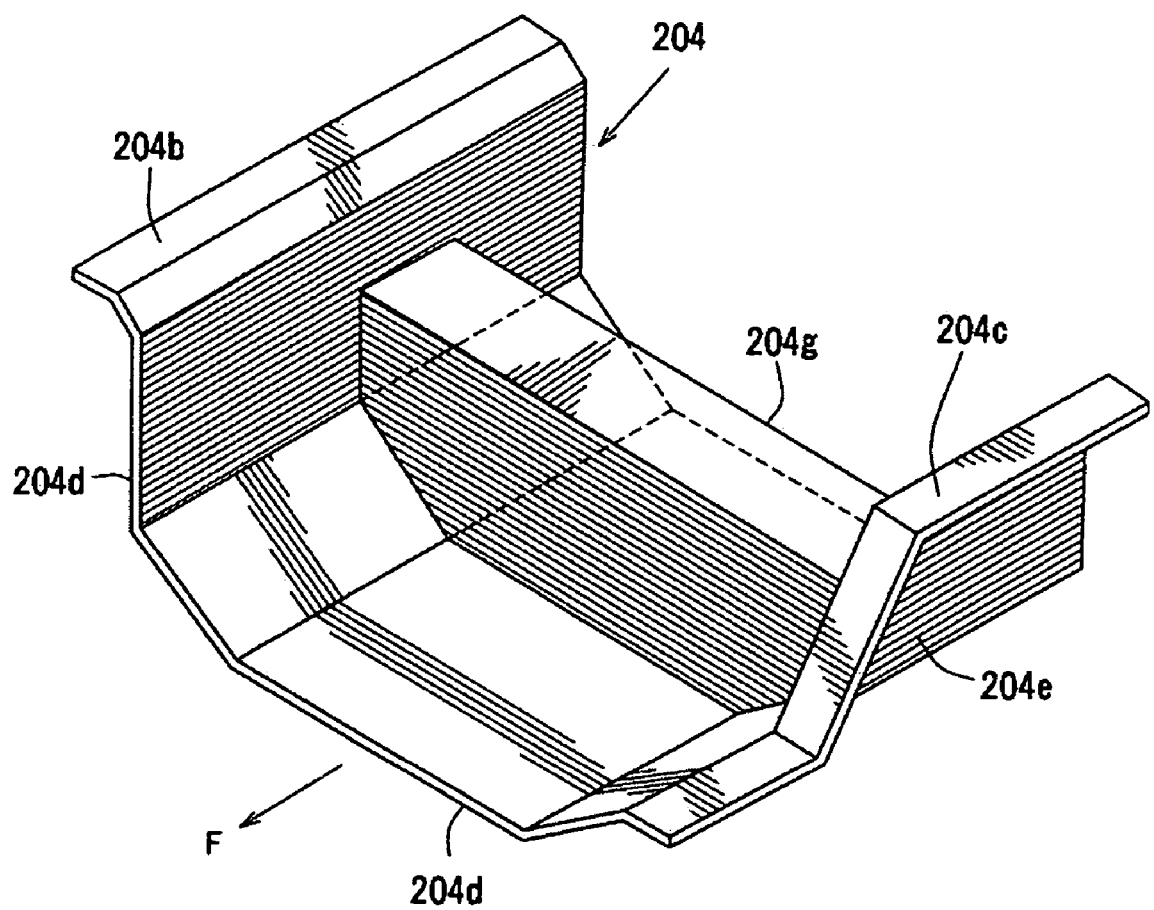
FIG. 33 is a perspective view showing one example of modification of the connecting member.

Further, as shown in FIG. 33, the connecting member 204 may include a sectionally gate-shaped reinforcing portion 204g formed to extend in the lateral direction and connected to each of the right and left vertical wall segments 204d, 204e. In this case, a laterally-extending closed section may be formed between the reinforcing portion 204g and the bottom segment 204f to provide enhanced rigidity in the connecting member 204 itself and the rear body and enhanced resistance against a side-impact collision.

Figure 34:
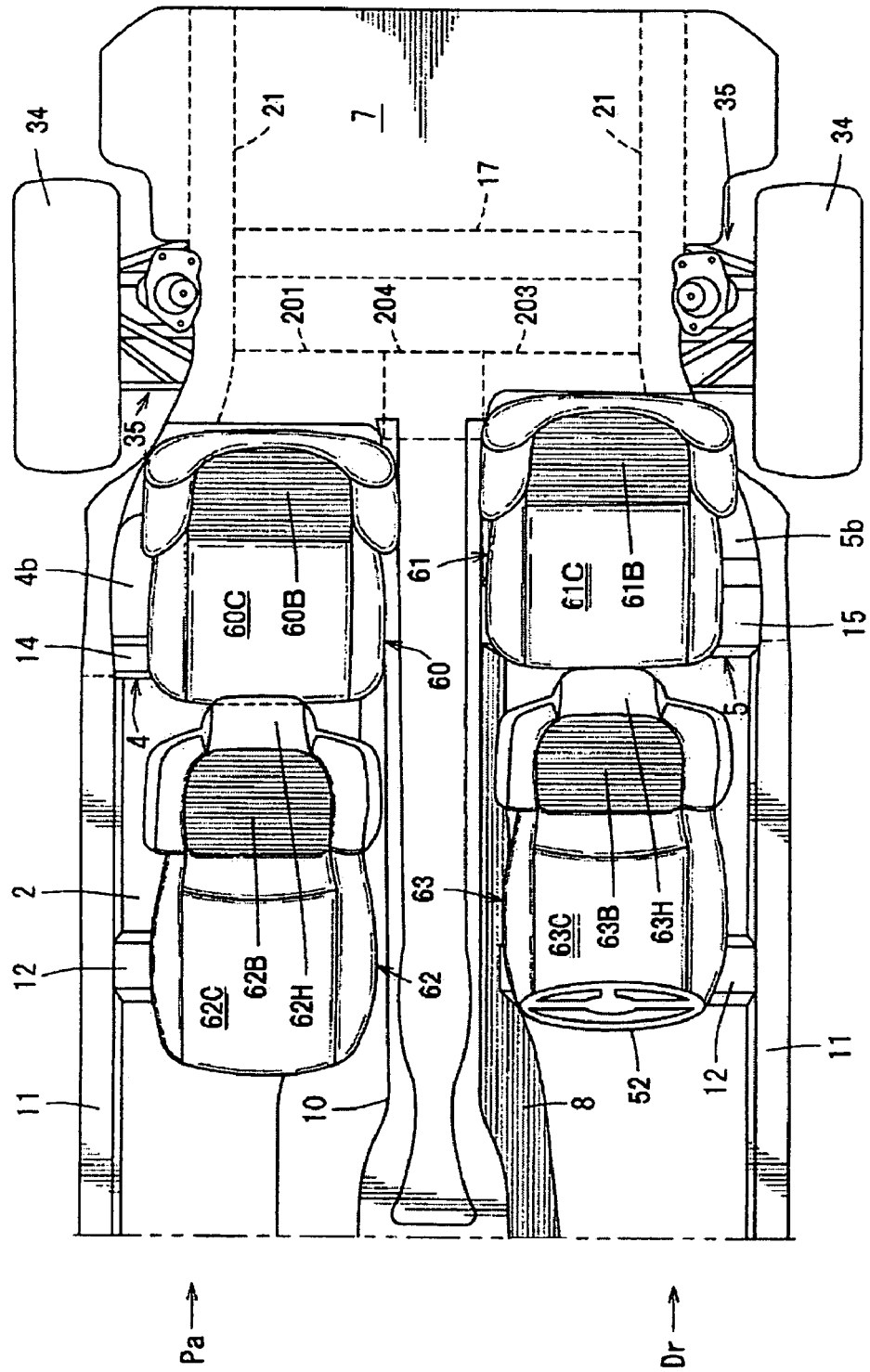
FIG. 34 is a top plan view showing the passenger compartment in FIG. 22 in a state after a driver's seat, a front passenger seat, and first and second rear seats are mounted on a floor panel.

FIG. 34 is a top plan view showing the passenger compartment in a state after seats are mounted on the floor panel. A first rear seat 60 is disposed on the first kick-up portion 4, and a second rear seat 61 for a passenger Y (see FIG. 19) having a small body size that that a passenger X (see FIG. 20) to be seated in the first rear seat 60 is disposed on the second kick-up portion 5.

The first and second rear seats 60, 61 are right/left independent, separate seats (bucket seats) each having a seat cushion (60C, 61C) and a seatback (60B, 61B). Further, as shown in FIG. 20, the seatback 60B of the first rear seat 60 is provided with a reclining mechanism comprising a reclining hinge pin 220 and a reclining hinge bracket 221, and designed to be reclined rearward about the reclining hinge pin 220.

A front passenger seat 62 is disposed in front of the first rear seat 60, and a driver's seat 63 is disposed in front of the second rear seat 61. In this arrangement, the passenger Y having a relatively small body size will be seated in the second rear seat 61. Thus, the driver's seat 63 can be arranged to have a wider space.

As with the rear seats, the front passenger seat 62 and the driver's seat 63 are right/left independent, separate seats (bucket seats) each having a seat cushion (62C, 63C) and a seatback (62B, 63B).

Further, as shown in FIG. 34, the front passenger seat 62 is displaced frontward relative to the driver's seat 63, and the first rear seat 60 is displaced frontward relative to the second rear seat 61.

Figure 35:
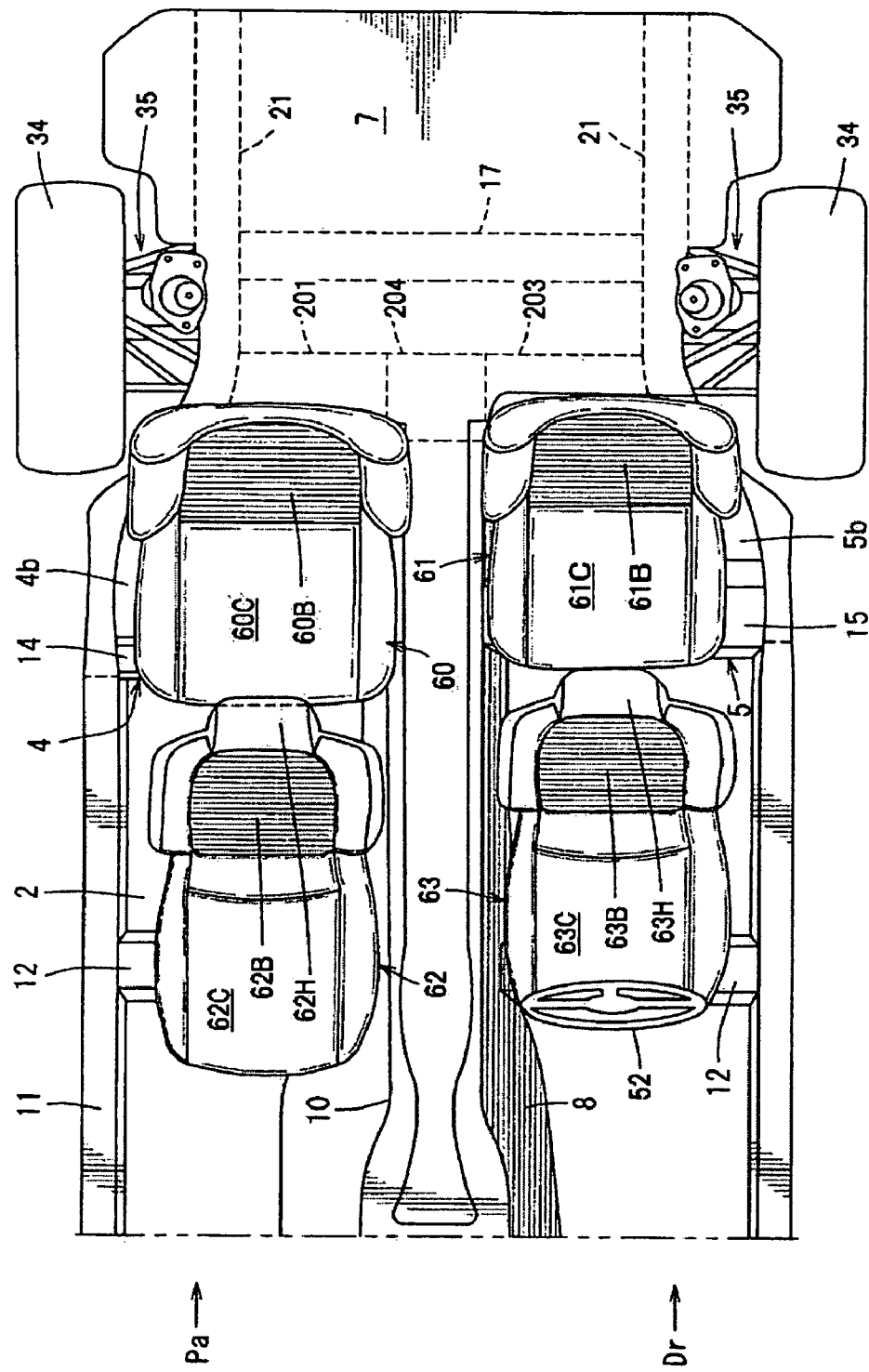
FIG. 35 is a top plan view showing the passenger compartment in FIG. 22 in the state after the seats are mounted on the floor panel, wherein the first rear seat has a larger size.

In view of optimization of a passenger compartment space, a rear seat having a larger size than that of the rear seat 60 in FIG. 34 may be disposed in place of the rear seat 60 (see FIG. 35).

In the figures, "F" indicates "front" of the vehicle, and "Z1" or "Z2" indicates a passenger seated in a front seat.

As mentioned above, this embodiment is designed to arrange an auxiliary component (sub-tank 210, main tank 211) of the vehicle, particularly, below the first and second kick-up portions 4, 5. Thus, a plurality of auxiliary components different in size can be sorted and efficiently arranged.

In addition, according to this structure, a first tank (sub-tank 210) can also be arranged below the first kick-up portion 4 having a relatively low height, to adequately ensure a capacity of the fuel tank.

Further, the sub-tank 210 and the main tank 211 can be fluidically and mechanically connected together in the above manner to effectively utilize a space below the first and second kick-up portions 4, 5 so as to ensure a capacity of the fuel tank, and simplify the structure of the fuel tank 213 so as to provide enhanced assembling efficiency Furthermore, a third auxiliary component (propeller shaft, a part of an exhaust pipe etc.) of the vehicle can be arranged below the tunnel-shaped tank member 212 for fluidically and mechanically connecting the sub-tank 210 and the main tank 211 so as to satisfy both of ensuring a capacity of the fuel tank and arranging the third auxiliary component.

Figure 36:
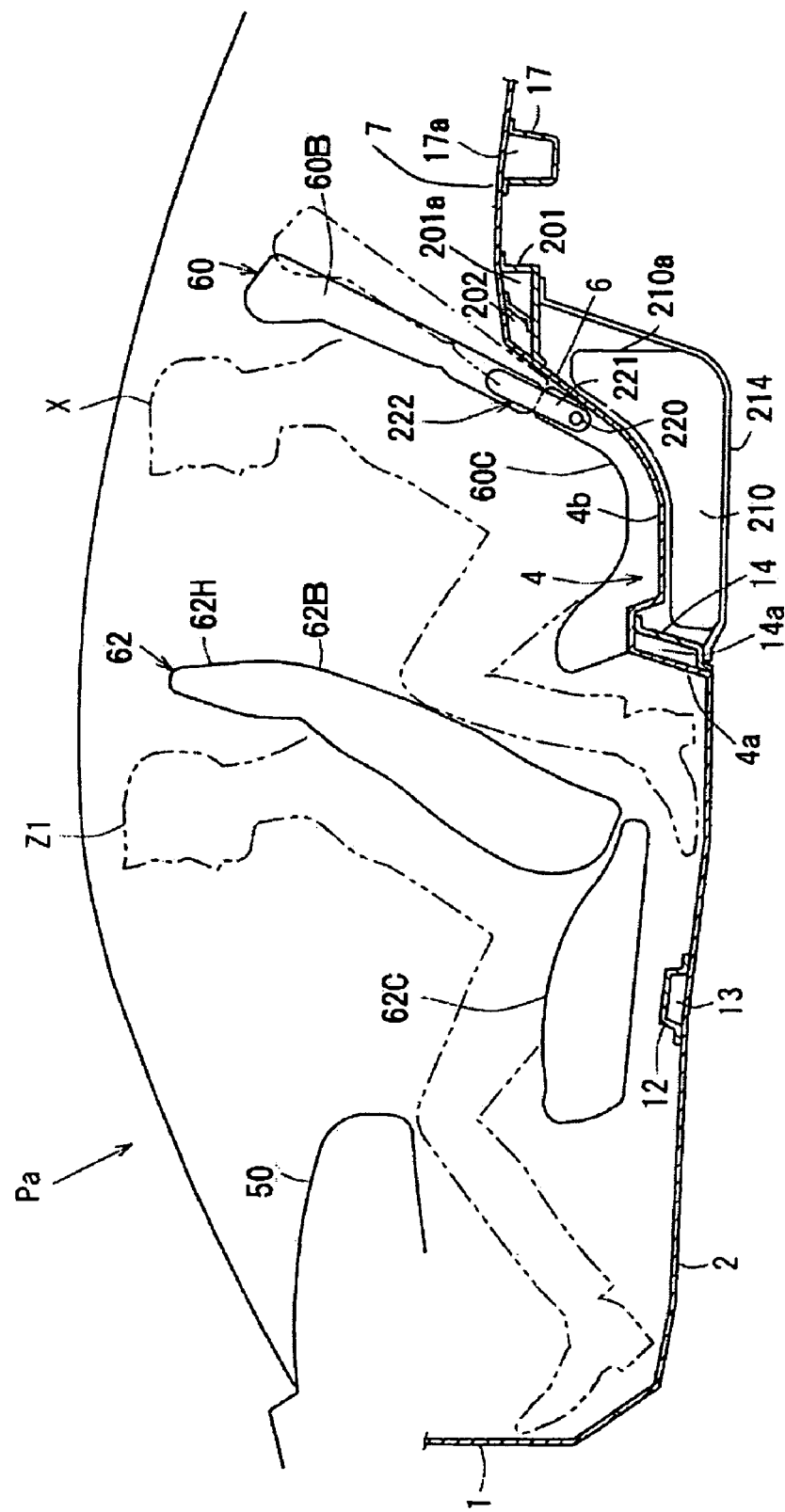
FIG. 36 is a side view showing one example of modification of the auxiliary-component arrangement structure in FIG. 18, viewed from the side of the front passenger seat.
Figure 37:
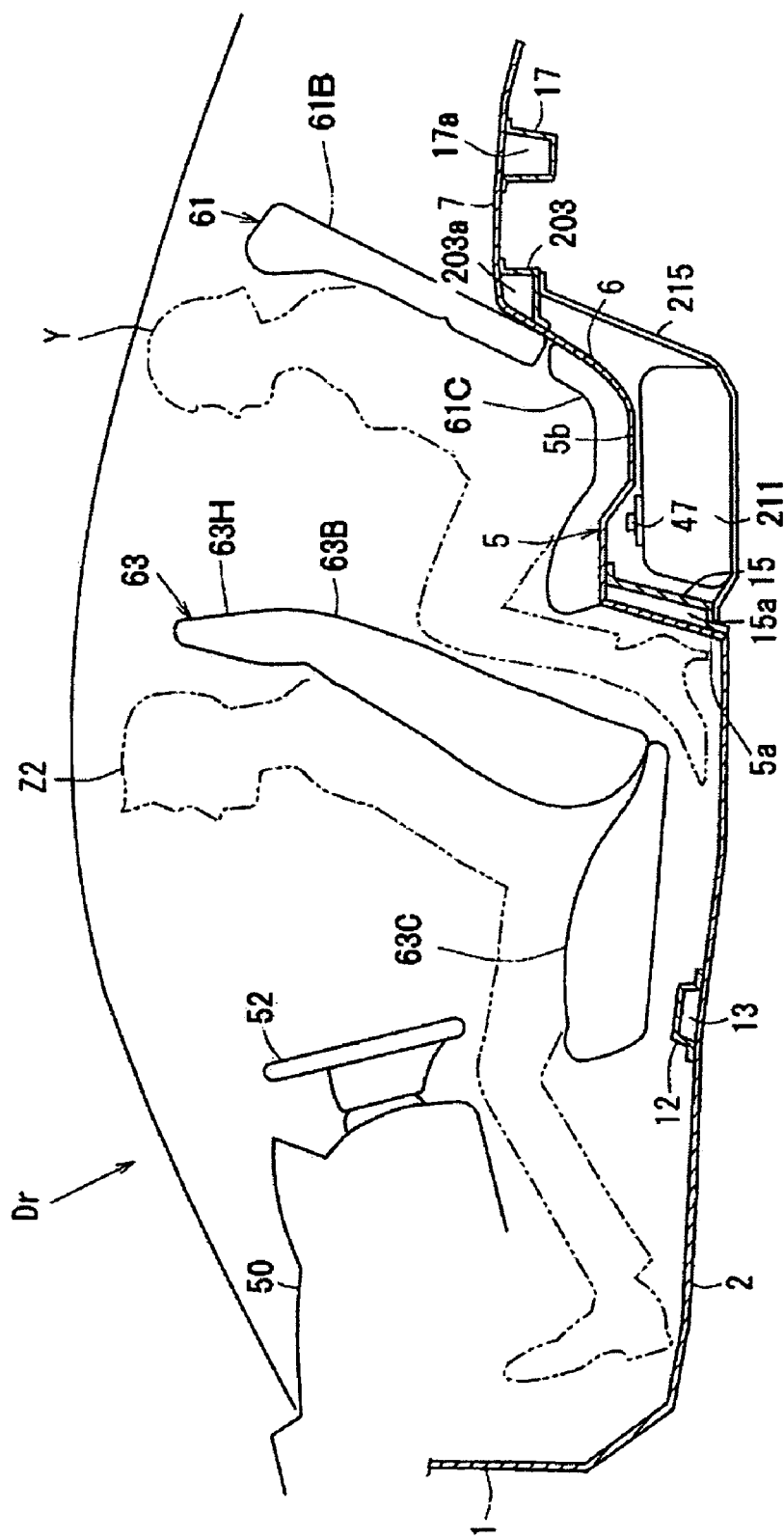
FIG. 37 is a side view showing the auxiliary-component arrangement structure in FIG. 36, viewed from the side of the driver's seat.

In the above embodiment, the lower cross members 14, 15 may be joined, respectively, to the under sides of the front ends of the first and second kick-up portions 4, 5, and the sub-tank 210 and the main tank 211 may be designed to have a shape causing no interference with the lower cross members 14, 15, as shown in FIGS. 36 and 37.

Further, as shown in FIGS. 38 to 41, a portion of the lower cross member 15 vertically opposed to a central region of the seat cushion 61C of the second rear seat 61 may be formed as a protruding portion 15b protruding upward, and the fuel pump 47 may be arranged below the protruding portion 15b.

Figure 38:
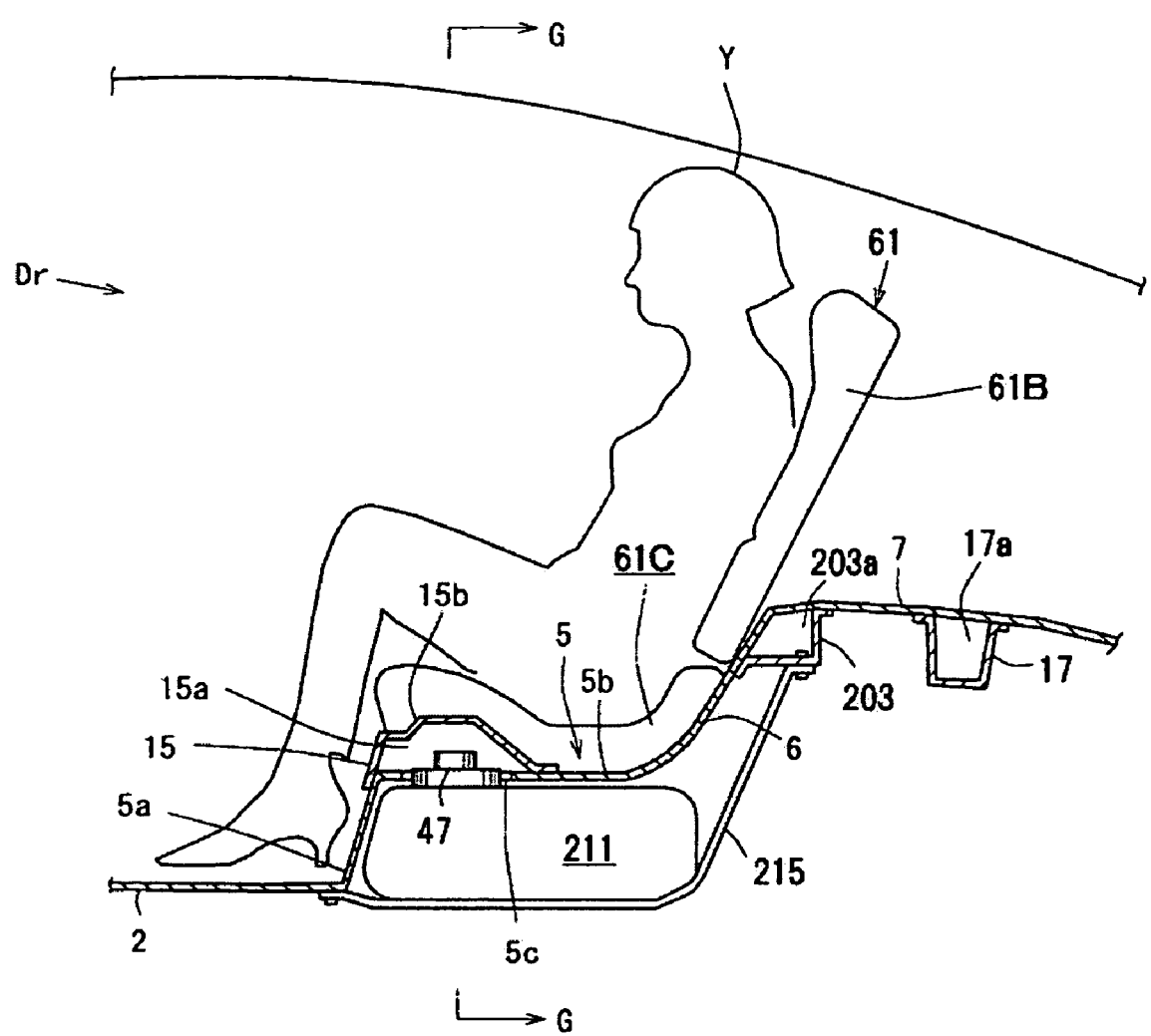
FIG. 38 is a fragmentary side view showing another example of modification of the auxiliary-component arrangement structure in FIG. 18.
Figure 39:
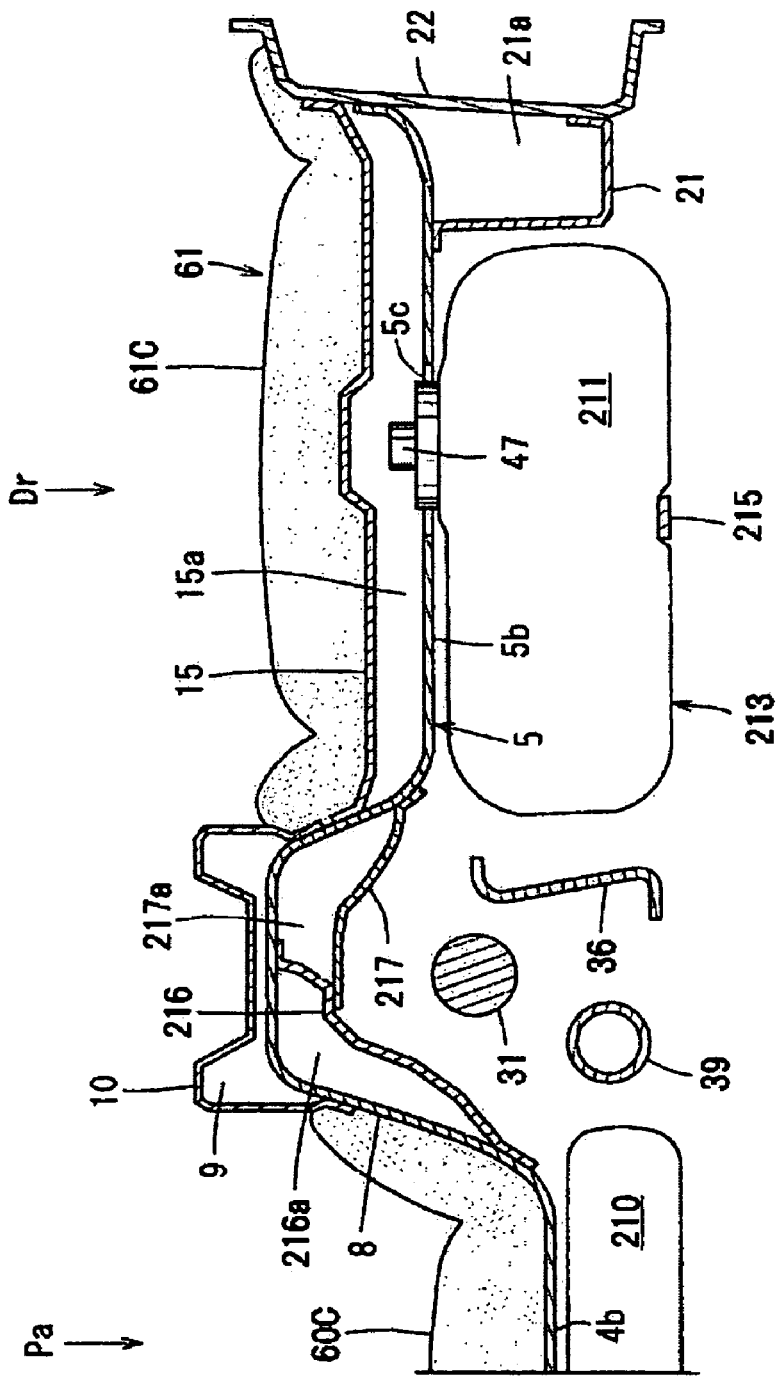
FIG. 39 is a sectional view taken along the line G-G in FIG. 38.
Figure 40:
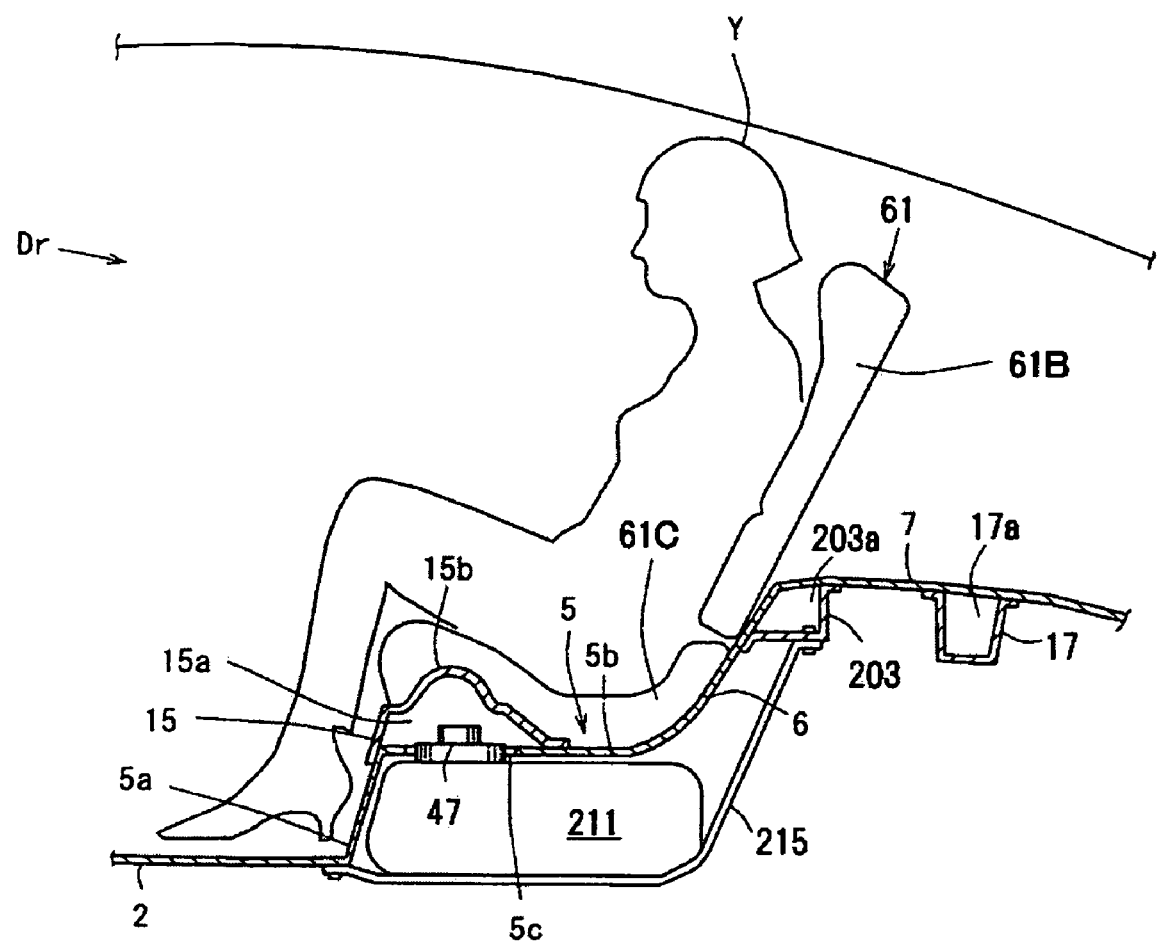
FIG. 40 is a fragmentary side view showing one example of modification of a protruding portion in FIG. 38.

The protruding portion 15b may be formed to have an approximately trapezoidal shape as shown in FIGS. 38 and 39, or may be formed to have a dome shape as shown in FIG. 40.

This structure makes it possible to provide further enhanced layout flexibility of the fuel tank 57 and/or the fuel tank 213. When a passenger Y is seated in the rear seat 61 in a usual manner, the protruding portion 15b will be located between the right and left lower legs of the passenger Y, and located within an approximately triangular region between the upper and lower thighs of the passenger Y, as shown in the top plan view of FIG. 41, and FIGS. 38 and 40. Thus, ride comfortability can be ensured without the risk of interference with the passenger Y.

While the above embodiments have been described based on an example where the present invention is applied to a vehicle with a left-hand steering wheel, the present invention is not limited to such a specific type.

In sum, according to a first aspect of the present invention, there is provided an arrangement structure for an auxiliary component of a vehicle in a region outside of a bottom surface of a passenger compartment of the vehicle, which comprises a floor panel defining the bottom surface of the passenger compartment and having a first kick-up portion and a second kick-up portion disposed in side-by-side relation to the first kick-up portion in a lateral direction of a vehicle body and formed to have a height greater than that of the first kick-up portion. The auxiliary component is arranged below the second kick-up portion.

In the arrangement structure set forth in the first aspect of the present invention, a large-size interior component can be placed on the first kick-up portion. Further, an auxiliary component can be arranged below the second kick-up portion, and a small-size interior component can be placed on the second kick-up portion. This makes it possible to provide enhanced layout flexibility in a limited vehicle space. In other words, the present invention allows for a desirable vehicle design capable of satisfying both of a low overall-height compact body and an adequate arrangement of the auxiliary component.

In a first preferred embodiment of the first aspect of the present invention, a fuel tank, or a catalytic converter or a silencer provided in an exhaust pipe, may be arranged below the second kick-up portion, as the auxiliary component.

Further, a plurality of auxiliary components may be arranged below the second kick-up portion in side-by-side relation to each other.

This structure makes it possible to effectively utilize a space formed below the second kick-up portion so as to allow the vehicle to be designed in a compact size.

In a second preferred embodiment of the first aspect of the present invention, the arrangement structure includes a first seat disposed on the first kick-up portion, and a second seat formed to have a smaller size than that of the first seat and disposed on the second kick-up portion.

This structure makes it possible to increase the number of passengers while maintaining a low overall-height compact body and assuring ride comfortability for each passenger.

In the second preferred embodiment, the second seat may be a child's seat.

This structure allows the child's seat to be disposed in a passenger compartment space adequate for ensuring safety.

In the second preferred embodiment, the first kick-up portion may include a front wall zone extending upward from the floor panel, and a kick-up floor zone which extends rearward from the front wall zone and has a concave shape.

This structure makes it possible to increase a passenger compartment space above the kick-up floor zone vertically so as to provide enhanced ride comfortability.

In a third preferred embodiment of the first aspect of the present invention, the arrangement structure includes a cross member joined the second kick-up portion in such a manner as to have a closed section and extend in the lateral direction. In this case, the cross member may include a plurality of cross members disposed in parallel and vertically spaced-apart relation to each other, or in parallel and longitudinally spaced-apart relation to each other.

This structure makes it possible to ensure adequate body rigidity while achieving a low overall-height compact body.

In the third preferred embodiment, the second kick-up portion may include a front wall zone extending upward from the floor panel, and a kick-up floor zone extending rearward from the front wall zone, and the cross member may include at least one cross member joined along the front wall zone, or along a corner region defined between the front wall zone and the kick-up floor zone, or along a rear region of the kick-up floor zone.

In the case where the cross member is joined along the front wall zone, the cross member makes it possible to ensure rigidity sufficient to compensate for relatively low rigidity of the floor panel and the front wall zone extending upward from the floor panel due to their approximately flat plate shape.

In the case where the cross member is joined along a corner region defined between the front wall zone and the kick-up floor zone, the cross member makes it possible to ensure sufficient rigidity in the corner region to be under relatively large load.

In the case where the cross member is joined along a rear region of the kick-up floor zone, the cross member makes it possible to ensure sufficient rigidity in a peripheral portion of a rear floor connected to the rear region of the kick-up floor zone.

In the third preferred embodiment, the auxiliary component may be a fuel tank arranged below the second kick-up portion.

This structure makes it possible to satisfy both of enhanced body rigidity and an adequate arrangement of the auxiliary component.

Preferably, a portion of the fuel tank opposed to the cross member is formed in a concave shape.

This structure makes it possible to avoid interference between the cross member and the fuel tank.

In the third preferred embodiment, the first kick-up portion may include a first front wall zone extending upward from the floor panel, and a first kick-up floor zone extending rearward from the first front wall zone, and the second kick-up portion may include a second front wall zone extending upward from the floor panel and a second kick-up floor zone extending rearward from the second front wall zone. Further, the cross member may include a first front cross member disposed joined along the second front wall zone, a second front cross member joined along the first front wall zone to extend in side-by-side relation to the first front cross member in the lateral direction, and a rear cross member joined along a rear region of the second kick-up floor zone. The rear cross member is formed to extend up to the first kick-up floor zone and joined therealong.

This structure makes it possible to provide enhanced rigidity in the entire vehicle and enhanced resistance to a side-impact collision.

According to a second aspect of the present invention, there is provided an arrangement structure for an auxiliary component of a vehicle in a region outside of a bottom surface of a passenger compartment of the vehicle, which comprises a floor panel defining the bottom surface of the passenger compartment and having a first kick-up portion and a second kick-up portion disposed in side-by-side relation to the first kick-up portion in a lateral direction of a vehicle body and formed to have a height greater than that of the first kick-up portion. The auxiliary component includes a first auxiliary component arranged below the first kick-up portion, and a second auxiliary component formed to have a height greater than that of the first auxiliary component and arranged below the second kick-up portion.

In the arrangement structure set forth in the first aspect of the present invention, the first and second auxiliary components can be arranged, respectively, below the first and second kick-up portions. Thus, two auxiliary components different in size can be efficiently arranged, respectively, in optimal positions thereto.

In a first preferred embodiment of the second aspect of the present invention, a first fuel tank is arranged as the first auxiliary component.

The first fuel tank arranged below the first kick-up portion having a relatively low height can serve as a secondary fuel tank to allow a total fuel tank capacity to be adequately ensured.

Preferably, a second fuel tank as the second auxiliary component is fluidically connected to the first fuel tank.

This structure makes it possible to effectively utilize respective spaces formed below the first and second kick-up portions so as to reliably ensure a total fuel tank capacity.

Preferably, the first and second fuel tanks are fluidically connected to one another through a tunnel-shaped tank member having laterally opposite ends each formed as an upward-standing inclined portion, and the auxiliary component includes a third auxiliary component arranged below the tunnel-shaped tank member.

This structure where the first and second fuel tanks are fluidically connected to one another through the tunnel-shaped tank member makes it possible to maximize the total fuel tank capacity. In addition, the first and second fuel tanks can be integrated together to provide a structurally simplified fuel tank, and facilitate a fuel-tank mounting operation.

Preferably, the third auxiliary component is at least either one of an exhaust pipe and a propeller shaft.

This structure makes it possible to adequately arrange the exhaust pipe and/or the propeller shaft while ensuring the total fuel tank capacity.

In a second preferred embodiment of the second aspect of the present invention, the arrangement structure includes a first seat disposed on the first kick-up portion, and a second seat designed for a passenger having a body size less than that of a passenger to be seated in the first seat, and disposed on the second kick-up portion.

In this structure, each of the first and second seats is formed in an optimal size to a height of a corresponding of first and second kick-up portions, and disposed on the corresponding kick-up portion. Thus, a passenger compartment space can be adequately allocated to and used for the first and second seats so as to increase number of passengers while maintaining a low overall-height compact body.

In the second preferred embodiment, the arrangement structure may include a front passenger seat disposed in front of the first seat, and a driver's seat disposed in side-by-side relation to the front passenger seat in the lateral direction and in front of the second seat.

Generally, a rear seat disposed behind a front passenger seat is more frequently used than another rear seat disposed behind a driver's seat. Thus, the above structure allows a passenger having a larger body size to use the first seat disposed behind the front passenger seat so as to provide enhanced user-friendliness.

Preferably, the front passenger seat is displaced relative to the driver's seat in a frontward direction of the vehicle body.

In this structure, only the front passenger seat having no steering wheel in front thereof to be displaced frontward. Thus, a space for the rear seat disposed behind the front passenger seat or first seat can be increased.

Preferably, the first seat is displaced relative to the second seat in the frontward direction.

This makes it possible to provide enhanced comfort for a rear-seat passenger.

In a third preferred embodiment of the second aspect of the present invention, the arrangement structure includes a cross member joined along a kick-up area consisting of the first and second kick-up portions, in the lateral direction, and at least either one of the first and second auxiliary components is at least partially arranged inside the cross member.

This structure makes it possible to effectively utilize an inner space of the cross member while ensuring body rigidity by the cross member, so as to ensure a wide passenger compartment space.

Preferably, as at least either one of the first and second auxiliary components, a fuel tank or a fuel pump fluidically connected to the fuel tank is partially arranged inside the cross member.

This structure makes it possible to increase a capacity of the fuel tank.

In the third preferred embodiment, the first auxiliary component may be a first fuel tank, and the second auxiliary component may be a second fuel tank having a capacity greater than that of first fuel tank.

This structure makes it possible to further increase a total fuel tank capacity.

Further, a fuel pump of the second fuel tank may be partially arranged inside the cross member to ensure a capacity of the fuel tank.

In the third preferred embodiment, the arrangement structure may include a first seat disposed on the first kick-up portion, and a second seat designed for a passenger having a body size less than that of a passenger to be seated in the first seat, and disposed on the second kick-up portion. In this case, preferably, the second auxiliary component is a fuel pump partially arranged inside the cross member at a position vertically opposed to a central region of a seat cushion of the second seat.

In this structure, the fuel pump is located at a position between the right and left lower legs of a passenger seated in the second seat, and therefore has low risk of interference with the passenger. This makes it possible to ensure enhanced ride comfortability for the passenger.

Preferably, the cross member has a protruding portion protruding upward at a position vertically opposed to the central region of the seat cushion of the second seat, and a part of the fuel pump is arranged inside the protruding portion and a surrounding portion thereof.

This structure makes it possible to provide enhanced layout flexibility of the fuel pump and the second fuel tank.

As mentioned above, the present invention can provide enhanced layout flexibility in respective spaces inside and outside of a passenger compartment, and allows for a desirable vehicle design capable of ensuring sufficient passenger compartment space while achieving a low overall-height compact body.

This application claims priority from five Japanese Patent Application Serial Nos. 2005-109319, 2005-110516, 2005-112960, 2005-266281, 2005-279538, filed in Japan Patent Office on Apr. 6, 2005, Apr. 7, 2005, Apr. 11, 2005, Sep. 14, 2005, and Sep. 27, 2005, respectively, thus the entire contents of which are hereby incorporated by reference. Stated other way, it is deemed that the contents of aforementioned Japanese applications constitute part of this application.

Although the present invention has been described in term of specific exemplary embodiments, it will be appreciated that various changes and modifications may be made by those skilled in the art without departing from the spirits and scope of the invention, defined in the following claims.

What is claimed is:

1. An arrangement structure for an auxiliary component of a vehicle in a region outside of a bottom surface of a passenger compartment of the vehicle, comprising:

a floor panel defining the bottom surface of said passenger compartment, said floor panel having a first kick-up portion, and a second kick-up portion disposed in side-by-side relation to said first kick-up portion in a lateral direction of a vehicle body and formed to have a height greater than that of said first kick-up portion, wherein said auxiliary component is arranged below said second kick-up portion; and a first seat disposed on said first kick-up portion, and a second seat formed to have a smaller size than that of said first seat and disposed on said second kick-up portion;

wherein said first kick-up portion includes a front wall zone extending upward from said floor panel, and a kick-up floor zone which extends rearward from said front wall zone and has a concave shape.

2. The arrangement structure according to claim 1, wherein said auxiliary component is a fuel tank.

3. The arrangement structure according to claim 2, wherein said auxiliary component includes a plurality of auxiliary components arranged below said second kick-up portion in side-by-side relation to each other in the lateral direction.

4. The arrangement structure according to claim 1, wherein said auxiliary component is an exhaust pipe.

5. The arrangement structure according to claim 4, wherein said exhaust pipe partially includes a catalytic convener or a silencer, wherein said catalytic convener or said silencer is arranged below said second kick-up portion.

6. The arrangement structure according to claim 1, wherein said second seat is a child's seat.

7. The arrangement structure according to claim 1, further comprising a cross member structure joined along said second kick-up portion in the lateral direction to form a closed section therebetween.

8. The arrangement structure according to claim 7, wherein said cross member structure includes a plurality of cross members disposed in parallel and vertically spaced-apart relation to each other.

9. The arrangement structure according to claim 7, wherein said cross member structure includes a plurality of cross members disposed in parallel and longitudinally spaced-apart relation to each other.

10. The arrangement structure according to claim 7, wherein said second kick-up portion includes a front wall zone extending upward from said floor panel, and a kick-up floor zone extending rearward from said front wall zone, wherein said cross member structure includes at least one cross member joined along said front wall zone.

11. The arrangement structure according to claim 7, wherein said second kick-up portion includes a front wall zone extending upward from said floor panel, and a kick-up floor zone extending rearward from said front wall zone, wherein said cross member structure includes at least one cross member joined along a corner region defined between said front wall zone and said kick-up floor zone.

12. The arrangement structure according to claim 7, wherein said second kick-up portion includes a front wall zone extending upward from said floor panel, and a kick-up floor zone extending rearward from said front wall zone, wherein said cross member structure includes at least one cross member joined along a rear region of said kick-up floor zone.

13. The arrangement structure according to claim 7, wherein said auxiliary component includes a fuel tank.

14. The arrangement structure according to claim 13, wherein a portion of said fuel tank opposed to said cross member structure is formed in a concave shape.

15. The arrangement structure according to claim 7, wherein:

said first kick-up portion includes a first front wall zone extending upward from said floor panel, and a first kick-up floor zone extending rearward from said first front wall zone;

said second kick-up portion includes a second front wall zone extending upward from said floor panel, and a second kick-up floor zone extending rearward from said second front wall zone; and said cross member structure includes a first front cross member joined along said second front wall zone, a second front cross member joined along said first front wall zone to extend in side-by-side relation to said first front cross member in the lateral direction, and a rear cross member joined along a rear region of said second kick-up floor zone, said rear cross member being formed to extend up to said first kick-up floor zone and joined therealong.

16. The arrangement structure according to claim 1, wherein said second seat is designed for a passenger having a body size less than that of a passenger to be seated in said first seat.

17. The arrangement structure according to claim 16, wherein said second seat is a child's seat.

18. The arrangement structure according to claim 1, which includes a pair of front seats disposed in front, respectively, of said first and second seats.

19. The arrangement structure according to claim 18, wherein said pair of front seats consist of a front passenger seat disposed in front of said first seat, and a driver's seat disposed in side-by-side relation to said front passenger seat in the lateral direction and in front of said second seat.

20. The arrangement structure according to claim 18, wherein said pair of front seats consist of a driver's seat and a front passenger seat which are disposed in side-by-side relation to one another, said front passenger seat being displaced relative to said driver's seat in a frontward direction of the vehicle body.

* * * * *

UNITED STATES PATENT AND TRADEMARK OFFICE
CERTIFICATE OF CORRECTION

PATENT NO. : 7,658,440 B2
APPLICATION NO. : 11/392686
DATED : February 9, 2010
INVENTOR(S) : Tohda et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 730 days.

Signed and Sealed this

Twenty-eighth Day of December, 2010

David J. Kappos
*Director of the United States Patent and Trademark Office*